(12) United States Patent
Ueki et al.

(10) Patent No.: US 7,815,174 B2
(45) Date of Patent: Oct. 19, 2010

(54) VIBRATION ISOLATOR

(75) Inventors: Akira Ueki, Kanagawa (JP); Hironori Adachi, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 1128 days.

(21) Appl. No.: 10/548,623

(22) PCT Filed: Mar. 11, 2004

(86) PCT No.: PCT/JP2004/003210

§ 371 (c)(1),
(2), (4) Date: Jul. 17, 2006

(87) PCT Pub. No.: WO2004/081408

PCT Pub. Date: Sep. 23, 2004

(65) Prior Publication Data

US 2006/0249891 A1 Nov. 9, 2006

(30) Foreign Application Priority Data

| Mar. 11, 2003 | (JP) | 2003-064967 |
| Mar. 11, 2003 | (JP) | 2003-065170 |
| Sep. 10, 2003 | (JP) | 2003-317723 |

(51) Int. Cl.
*F16F 5/00* (2006.01)

(52) U.S. Cl. .......... 267/140.13; 267/140.11; 267/219

(58) Field of Classification Search .......... 267/140.13, 267/140.11, 219
See application file for complete search history.

(56) References Cited

U.S. PATENT DOCUMENTS

| 4,660,812 A | * | 4/1987 | Dan et al. | 267/140.13 |
| 4,697,793 A | | 10/1987 | Reuter et al. | |
| 5,370,375 A | | 12/1994 | Kojima | |
| 5,642,873 A | * | 7/1997 | Kato | 267/140.14 |
| 5,911,412 A | * | 6/1999 | Durand et al. | 267/140.13 |
| 6,244,578 B1 | * | 6/2001 | Schwerdt | 267/140.13 |
| 6,267,362 B1 | * | 7/2001 | Satori et al. | 267/140.13 |
| 6,349,927 B1 | * | 2/2002 | Suzuki | 267/140.13 |
| 6,439,554 B1 | * | 8/2002 | Takashima et al. | 267/140.13 |

(Continued)

FOREIGN PATENT DOCUMENTS

DE 3501628 A1 7/1986

(Continued)

OTHER PUBLICATIONS

International Search Report.

*Primary Examiner*—Robert A Siconolfi
*Assistant Examiner*—Mariano Sy
(74) *Attorney, Agent, or Firm*—Sughrue Mion, PLLC

(57) ABSTRACT

A vibration isolator which is capable of stably opening and closing an orifice is provided at low manufacturing cost. A plunger for opening and closing an idle orifice is disposed in a manner that is slidably engaged with the inner wall surface of an orifice-forming member. A shaft portion extending downward is formed in the central portion of the plunger. A convex portion which is formed with a through-hole in which the shaft portion is slidably is provided on the bottom of the orifice-forming member so as to provide a bearing portion. The shaft portion of the plunger and the bearing portion of the orifice-forming member constitute a guide member for guiding the reciprocating motion of this plunger.

4 Claims, 27 Drawing Sheets

U.S. PATENT DOCUMENTS 6,592,110 B2 * 7/2003 Takashima et al. ..... 267/140.13
6,619,636 B2 * 9/2003 Yamamoto et al. ..... 267/140.13
7,052,003 B2 * 5/2006 Ueki ..................... 267/140.13

FOREIGN PATENT DOCUMENTS

| | | |
|---|---|---|
| FR | 2576380 A1 | 7/1986 |
| IT | 1185401 | 11/1987 |
| JP | 89570 C2 | 12/1930 |
| JP | 31-1861 Y1 | 2/1956 |
| JP | 57-160456 A | 10/1982 |
| JP | 5-223139 A | 8/1983 |
| JP | 61-171931 A | 8/1986 |
| JP | 9-144805 A | 6/1997 |

* cited by examiner

F I G. 10
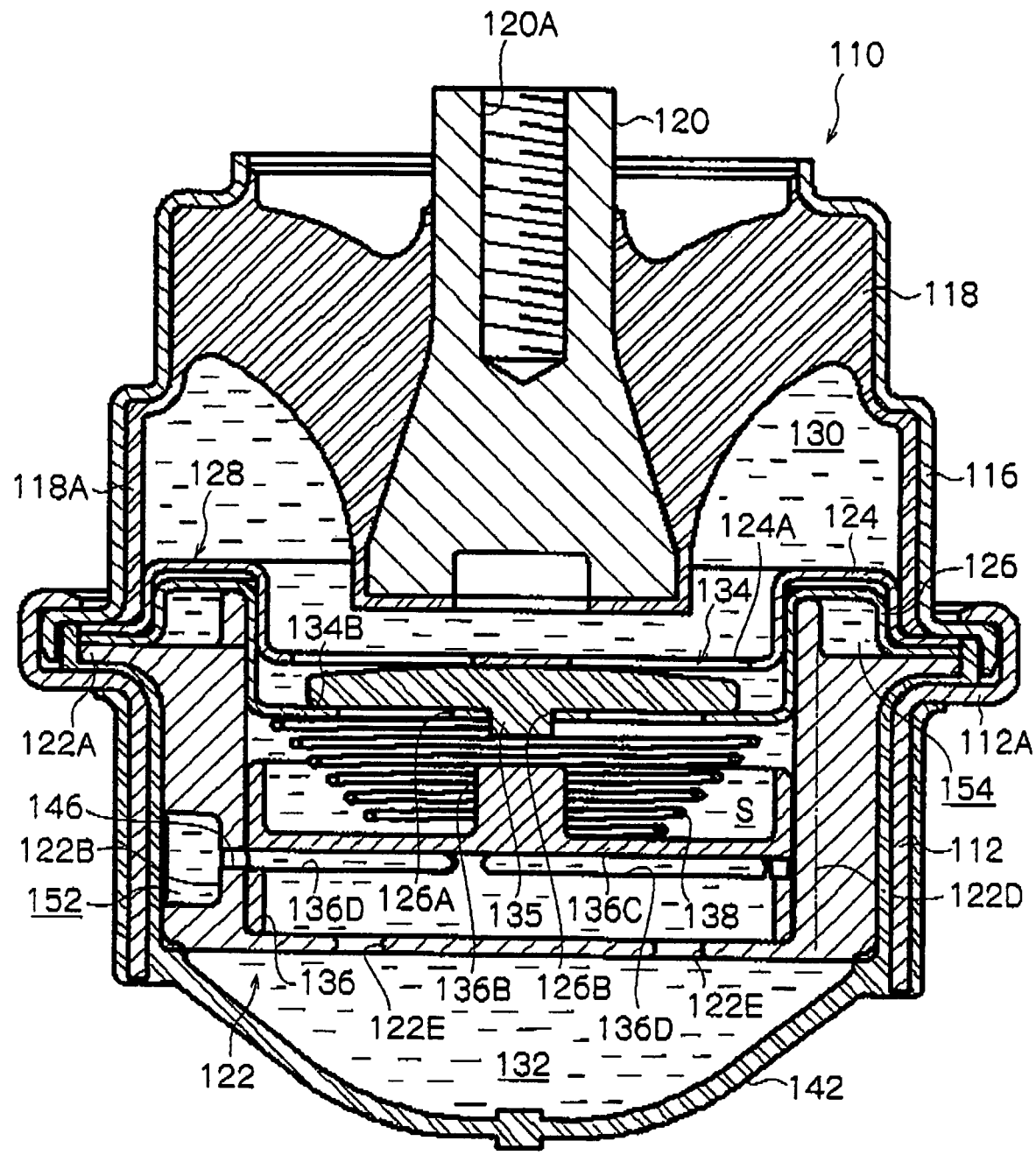

F I G. 2 2
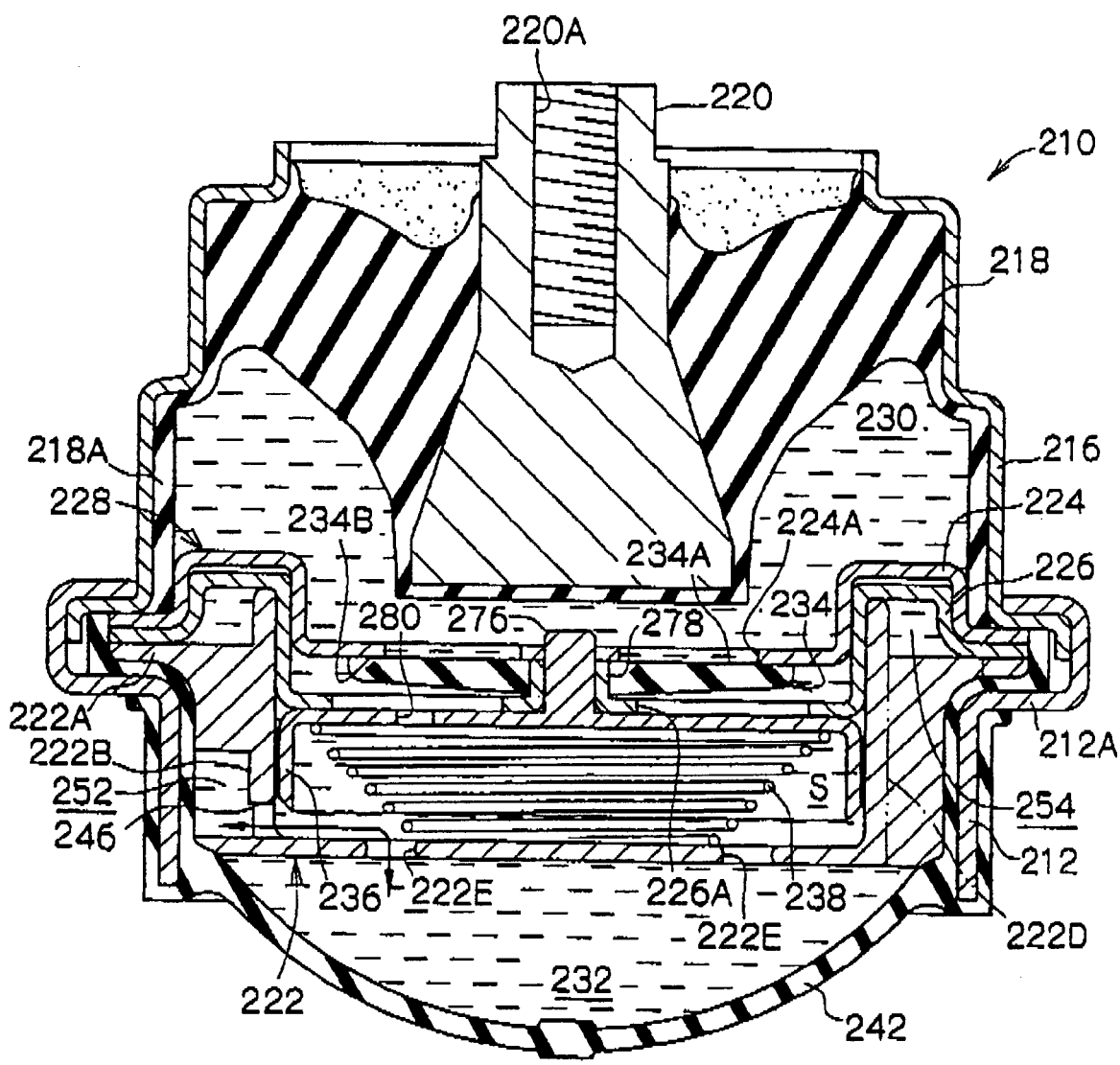

VIBRATION ISOLATOR

BACKGROUND OF THE INVENTION

1. Field of the Invention

The present invention relates to a vibration isolator for preventing the transmission of the vibration from a member which generates vibration, and portionicularly to a vibration isolator which can be adopted for a fluid-filled type vibration isolator which is applicable to engine mounts, bushings, and the like for motor vehicles.

2. Description of the Related Art

For example, between the engine, which provides the vibration generation portion of a vehicle, and the vehicle body, which provides the vibration reception portion, a vibration isolator as an engine mount is disposed to absorb the vibration generated by the engine thereby preventing the vibration from being transmitted to the vehicle body.

And, as an example of this type of vibration isolator, a vibration isolator as a controlling mount has conventionally been known which is filled with a fluid and has a structure capable of changing over the orifice, i.e., the passage for the fluid, in order to accommodate the vibration having a wide range of frequency.

In other words, for such a vibration isolator, not only an electric actuator, a solenoid valve, or the like, for changing over the passage among a plurality of orifices has been required, but also a controller for operating the actuator, solenoid valve, or the like, on the basis of the traveling conditions for the vehicle, and changing over the orifice has been required from the nature of the structure.

However, such an actuator, solenoid valve, and controller are relatively costly, and thus these components have been a factor for increasing the cost for manufacturing the vibration isolator.

SUMMARY OF THE INVENTION

The present invention has been made in view of the above circumstances and provides a vibration isolator which is capable of reducing the manufacturing cost.

The vibration isolator according to a first aspect of the invention is characterized in that it comprises:

a first mounting member which is connected to one of a vibration generation portion and a vibration reception portion;

a second mounting member which is connected to the other of the vibration generation portion and the vibration reception portion;

an elastic element which is disposed between the first and second mounting members, and is capable of being elastically deformed;

a main fluid chamber which has the elastic element as a portion of a partition wall and is filled with a fluid, and whose internal volume is changed with deformation of the elastic element;

a fluid sub-chamber configured such that at least a portion of the partition wall is deformably formed, and which is filled with a fluid;

an orifice which communicates between the main fluid chamber and the fluid sub-chamber;

an opening and closing member which is reciprocatably disposed in a space including a portion of the orifice and causes the orifice to be opened and closed due to a reciprocating motion thereof;

a check valve which is disposed between the main fluid chamber and the opening and closing member, and allows the fluid to flow from the main fluid chamber only toward the opening and closing member side; and an elastic member which biases the opening and closing member toward the check valve;

wherein the check valve is comprised of a valve body and a valve seat;

the valve body is made of an elastic material, a surface thereof which is disposed in opposition to the main fluid chamber being made concave; and the valve body is disposed under a preload applied toward the main fluid chamber side such that the surface of the valve body that is disposed in opposition to the main fluid chamber is pressed against the valve seat.

The vibration isolator according to a second aspect of the invention is characterized in that, the elastic material forming the valve body is a rubber material or a synthetic resin material.

The vibration isolator according to a third aspect of the invention is characterized in that, the elastic member is a coil spring formed in a tapered helical shape.

The vibration isolator according to a fourth aspect of the invention is characterized in that it comprises:

a first mounting member which is connected to one of a vibration generation portion and a vibration reception portion;

a second mounting member which is connected to the other of the vibration generation portion and the vibration reception portion;

an elastic element which is disposed between these mounting members, and is elastically deformable;

a main fluid chamber which has the elastic element as a portion of a partition wall and is filled with a fluid, and whose internal volume is changed in compliance with deformation of the elastic element;

a fluid sub-chamber in which at least a portion of a partition wall is deformably formed, and which is filled with a fluid;

an orifice which communicates between the main fluid chamber and the fluid sub-chamber;

an opening and closing member which is reciprocatably disposed in a space including a portion of the orifice and causes the orifice to be opened and closed due to a reciprocating motion thereof;

a check valve which is disposed between the main fluid chamber and the opening and closing member and allows the fluid to flow from the main fluid chamber only toward the opening and closing member;

an elastic member which biases the opening and closing member toward the check valve; and a guide member which is disposed in correspondence to a central portion of the opening and closing member for guiding the reciprocating motion of the opening and closing member.

The vibration isolator according to a fifth aspect of the invention is characterized in that, the check valve is comprised of a valve body and a valve seat; the valve body is formed of an elastic material; and the valve body is disposed under a preload applied toward the main fluid chamber such that the surface of the valve body that is opposed to the main fluid chamber is pressed against the valve seat.

The vibration isolator according to a sixth aspect of the invention is characterized in that, the elastic material forming the valve body is a rubber material or a synthetic resin material.

The vibration isolator according to a seventh aspect of the invention is characterized in that, the opening and closing member is reciprocatably disposed, and the orifice-forming member which forms the orifice is provided between the main fluid chamber and the fluid sub-chamber; and a guide member is comprised of a shaft portion formed in the central portion of the opening and closing member, and a bearing portion formed in the orifice-forming member.

The vibration isolator according to an eighth aspect of the invention is characterized in that, the opening and closing member is reciprocatably disposed, and an orifice-forming member which forms the orifice is provided between the main fluid chamber and the fluid sub-chamber; and a guide member is comprised of a bearing portion formed in the central portion of the opening and closing member, and a shaft portion formed in the orifice-forming member.

The vibration isolator according to a ninth aspect of the invention is characterized in that, a partition member which partitions between the main fluid chamber and the fluid sub-chamber and contains the check valve is provided between these main fluid chamber and fluid sub-chamber; and a guide member is comprised of a shaft portion formed in the central portion of the opening and closing member, and a bearing portion formed in the partition member.

The vibration isolator according to a tenth aspect of the invention is characterized in that, a partition member which partitions between the main fluid chamber and the fluid sub-chamber and contains the check valve is provided between these main fluid chamber and fluid sub-chamber; and a guide member is comprised of a bearing portion formed in the central portion of the opening and closing member, and a shaft portion formed in the partition member.

The vibration according to an eleventh aspect of the invention is characterized in that it comprises:

a first mounting member which is connected to one of a vibration generation portion and a vibration reception portion;

a second mounting member which is connected to the other of the vibration generation portion and the vibration reception portion;

an elastic element which is disposed between the first and second mounting members and is elastically deformable;

a main fluid chamber which has the elastic element as a portion of a partition wall and is filled with a fluid, and whose internal volume is changed in compliance with deformation of the elastic element;

a fluid sub-chamber ion which at least a portion of a partition wall is deformably formed, and which is filled with a fluid;

an orifice which communicates between the main fluid chamber and the fluid sub-chamber;

an opening and closing member which is reciprocatably disposed in the space including a portion of the orifice and causes the orifice to be opened and closed due to a reciprocating motion thereof;

a check valve which is disposed between the main fluid chamber and the opening and closing member and allows the fluid to flow from the opening and closing member side only toward the main fluid chamber; and an elastic member which biases the opening and closing member in a direction away from the check valve side;

wherein said check valve is comprised of a valve body and a valve seat;

the valve body constituting this check valve is formed of an elastic material; and in the portion of the opening and closing member that is opposed to the valve body, there is provided a abutting portion which can be abutted against the valve body when the abutting portion is brought close to the valve body.

The vibration isolator according to a twelfth aspect of the invention characterized in that, the abutting portion is formed in a shape which is protruded toward the valve body.

The vibration isolator according to a thirteenth aspect of the invention is characterized in that, the elastic material forming the valve body is a rubber material or a synthetic resin material.

The vibration isolator according to a fourteenth aspect of the invention is characterized in that, it includes a guide member which is disposed in correspondence to the central portion of the opening and closing member for guiding the reciprocating motion of the opening and closing member.

The vibration isolator according according to a fifteenth aspect of the invention is characterized in that, the opening and closing member is reciprocatably disposed, and an orifice-forming member which forms the orifice is provided between the main fluid chamber and the fluid sub-chamber; and a guide member is comprised of a shaft portion formed in the central portion of the opening and closing member, and a bearing portion formed in the orifice-forming member.

The vibration isolator according to a sizteenth aspect of the invention is characterized in that, the opening and closing member is reciprocatably disposed, and an orifice-forming member which forms the orifice is provided between the main fluid chamber and the fluid sub-chamber; and a guide member is comprised of a bearing portion formed in the central portion of the opening and closing member, and a shaft portion formed in the orifice-forming member.

The vibration isolator according to a seventeenth aspect of the invention is characterized in that, a partition member which partitions between the main fluid chamber and the fluid sub-chamber and contains the check valve is provided between these main fluid chamber and fluid sub-chamber; and a guide member is comprised of a bearing portion formed in the central portion of the opening and closing member, and a shaft portion formed in the partition member.

The vibration isolator according to an eighteenth aspect of the invention is characterized in that, a partition member which partitions between the main fluid chamber and the fluid sub-chamber, and contains the check valve is provided between the main fluid chamber and the fluid sub-chamber; and a guide member is comprised of a shaft portion formed in the central portion of the opening and closing member, and a bearing portion formed in the partition member.

The vibration isolator according to a nineteenth aspect of the invention is characterized in that, two orifices exist, said orifice which is opened and closed by the opening and closing member being provided as an idle orifice, and the other orifice being provided as a shake orifice which is formed more thinly or more longly than the idle orifice.

The operation of the vibration isolator according to the first aspect of the invention will be described hereinbelow.

When a vibration is transmitted from the vibration generation portion connected to either one of the pair of mounting members, this mounting member is displaced so as to cause the elastic element disposed between the pair of mounting members to be elastically deformed, so that the vibration is absorbed by virtue of the vibration damping capacity based on the internal friction of this elastic element, and thus the vibration is reduced. In other words, the absorption of the vibration due to the deformation of the elastic element makes it difficult for the vibration to be transmitted to the vibration reception portion connected to the other mounting member.

On the other hand, in the present invention, the main fluid chamber in which a portion of the partition wall is formed of the elastic element and which is filled with the fluid, and the fluid sub-chamber in which at least a portion of the partition wall is deformably formed and which is filled with the fluid in the same manner communicate with each other through the orifice. Further, in the space including a portion of this orifice, the opening and closing member is reciprocatably disposed; the check valve which is disposed between the main fluid chamber and this opening and closing member causes the fluid to flow from the main fluid chamber only toward the opening and closing member; and the elastic member biases this opening and closing member toward this check valve side.

Thus, due to the deformation of the elastic element that is caused with the vibration being applied to the vibration isolator, the main fluid chamber which is filled with the fluid is expanded and contracted so that the internal volume thereof is changed, and due to a fluid pressure fluctuation which is caused in response to the internal volume of the main fluid chamber being changed, the opening and closing member makes a reciprocating motion to open and close the orifice.

In other words, when a vibration input with a low amplitude is applied to the vibration isolator, the pre-compression load provided by the elastic member which biases the opening and closing member toward the check valve side is higher than the force generated due to the fluid pressure fluctuation in the main fluid chamber, and thus there occurs a state in which the check valve is closed and the opening and closing member is at standstill. Consequently, the orifice is opened so that he fluid is permitted to flow from the main fluid chamber into the orifice, and thus a pressure change, a viscous drag and the like are caused while the fluid is being circulated through this orifice, with the fluid flowing between the main fluid chamber and the fluid sub-chamber. Therefore, the vibration is also reduced due to fluid column resonance, the viscous drag or the like of the fluid, which makes it still more difficult for the vibration to be transmitted to the vibration reception portion.

On the other hand, when a vibration input having a relatively high amplitude is applied to the vibration isolator, the force generated due to a fluid pressure fluctuation in the main fluid chamber is also increased and exceeds the pre-compression load imparted by the elastic member, so that the check valve is opened, and the opening and closing member is moved to the elastic member side against the biasing force by the elastic member, being pressed by the fluid having flown in from the main fluid chamber, until it comes to a standstill in the position where the maximum of the fluid pressure fluctuation in the main fluid chamber is balanced with the biasing force of the elastic member. And, by the opening and closing member being thus moved to the elastic member side, a portion of the orifice is shut off by the opening and closing member, so that the fluid is prevented from flowing wintihn the orifice.

Thus, the vibration isolator according to the present aspect of the invention can reduce vibration over a wide range as with a conventional vibration isolator without using an actuator, a solenoid valve, a controller and the like and by changing over the irifices. For this reason, according to the present aspect of the invention, the manufacturing cost can be reduced, while the vibration isolating performance of the vibration isolator is maintained.

Further, the present aspect of the invention provides a structure in which the check valve is comprised of a valve body and a valve seat; this valve body is formed of an elastic material, the surface opposed to the main fluid chamber being made concave; and the valve body is disposed under a preload applied toward the main fluid chamber such that the surface of the valve body that is opposed to the main fluid chamber is pressed against the valve seat.

In other words, with a structure in which the valve body is supported by a hinge, it is required that the valve body be reduced in weight in order to cause the check valve to be reliably operated; therefore, the durability of the check valve against pressure fluctuation of the fluid in the vibration isolator is low, and the mass productivity of the vibration isolator is also low since the valve body is supported by a complex structure such as a hinge In contrast thereto, according to the present aspect of the invention, a structure is provided in which not only the surface of the valve body formed of an elastic material that is in opposition to the main fluid chamber is formed in a concave shape, but also the valve body is subjected to a preload applied toward the main fluid chamber side such that the surface of this valve body that is in opposition to the main fluid chamber is pressed against the valve seat. That is, the check valve of the present aspect of the invention has a simple structure which simply utilizes the elasticity of the valve body formed of an elastic material. Thus, not only can the check valve be reliably opened and closed as required, but also the durability of the check valve as well as the mass productivity of the vibration isolator is increased.

The operation of the vibration isolator according to the second aspect of the invention will be described hereinbelow.

The structure according to the second aspect of the invention is similar to that of the first aspect of the invention, which operates in a similar manner, and it further provides a structure in which the elastic material forming the valve body is a rubber material or a synthetic resin material.

That is, by using a rubber material or a synthetic resin material, not only can the valve body be reliably elastically deformed, but also the valve body can be obtained at low cost. Thus, it is possible to more reliably achieve the operational effects of the first aspect of the invention that not only can the check valve be reliably opened and closed as required, but also the durability of the check valve and the volume productivity of the vibration isolator is increased can be more reliably obtained.

The operation of the vibration isolator according to the third aspect of the invention will be described hereinbelow.

The The structure according to the third aspect of the invention is similar to that of the first and second aspects of the invention, which operates in a similar manner, and it further provides a structure in which the elastic member is a coil spring formed in a tapered helical shape.

According to the third aspect of the invention, the coil spring, i.e., the elastic member is formed in a tapered helical shape such that even when the coil spring is compressed, the wire turns of the coil spring will not be caused to contact one another, which eliminates a possibility that the spring constant of the coil spring is non-linearly changed so as to be abruptly increased. Thus, even when the coil spring is disposed in a small space in the vibration isolator, it represents a stable Young's modulus and thus functions as an elastic member satisfactorily.

That is, not only can the manufacturing cost be reduced while the vibration isolating performance of the vibration isolator is being maintained, but also the Young's modulus of the coil spring is rendered constant so that the coil spring can serve as an elastic member satisfactorily.

The operation of the vibration isolator according to the fourth aspect of the invention will be described hereinbelow.

When a vibration is transmitted from the vibration generation portion connected to either one of the pair of mounting members, this mounting member is displaced, which causes the elastic element disposed between the pair of mounting members to be elastically deformed, so that the vibration is absorbed so as to be reduced due to the vibration damping performance based on the internal friction of this elastic element. In other words, the absorption of the vibration due to the deformation of the elastic element makes it difficult for the vibration to be transmitted to the vibration reception portion connected to the other mounting member.

On the other hand, in the present aspect of the invention, the main fluid chamber in which a portion of the partition wall is formed by the elastic member and which is filled with the fluid, and the fluid sub-chamber with which at least a portion of the partition wall is deformably formed and which is also filled with the fluid, are communicated with each other through the orifice. Further, in the space including a portion of this orifice, the opening and closing member is reciprocatably disposed; the check valve which is disposed between the main fluid chamber and this opening and closing member causes the fluid to flow from the main fluid chamber only toward the opening and closing member; and the elastic member biases this opening and closing member toward the check valve.

Thus, due to the deformation of the elastic element that is caused with the vibration being applied to the vibration isolator, the main fluid chamber which is filled with the fluid is expanded and contracted so that the internal volume thereof is changed. further due to a fluid pressure fluctuation which is caused in compliance with the internal volume of the main fluid chamber being changed, the opening and closing member makes a reciprocating motion so as to open and close the orifice.

That is, when a vibration input having a low amplitude is applied to the vibration isolator, the pre-compression load provided by the elastic member which biases the opening and closing member toward the check valve side is higher than the force generated due to the fluid pressure fluctuation in the main fluid chamber, and thus a state occurs in which the check valve is closed and the opening and closing member is at standstill. Therewith, the orifice is opened, and the fluid is caused to flow from the main fluid chamber into the orifice, so that a pressure change, a viscous drag, and the like are caused while the fluid is being circulated through this orifice and flowing between the main fluid chamber and the fluid sub-chamber. Thus, the vibration is reduced also due to the fluid column resonance, the viscous drag, and the like, of the fluid, which makes it more difficult for the vibration to be transmitted to the vibration reception portion.

On the other hand, when a vibration input having a relatively high amplitude is applied to the vibration isolator, the force generated due to fluid pressure fluctuation in the main fluid chamber is also increased so as to exceed the pre-compression load provided by the elastic member, so that the check valve is opened, and the opening and closing member is moved to the elastic member side while resisting the biasing force of the elastic member and being pushed by the fluid having flowed in from the main fluid chamber, until it comes to a standstill in the position where the maximum of the fluid pressure fluctuation in the main fluid chamber is balanced with the biasing force of the elastic member. And, due to the opening and closing member being thus moved to the elastic member side, a portion of the orifice is shut off by this opening and closing member so that the fluid is prevented from flowing within this orifice.

Further, according to the present claim, the guide member which is disposed in correspondence to the central portion of the opening and closing member guides the above-mentioned reciprocating motion of the opening and closing member, and thus the possibility is eliminated that the opening and closing member is inclined obliquely, and therewith, the possibility is also eliminated that the opening and closing member is stopped without making a fill reciprocating motion; thus the opening and closing member reliably makes a reciprocating motion so that the idle orifice is stably opened and closed.

Thus, the vibration isolator according to the present aspect of the invention can reduce the vibration over a wide range as with the conventional vibration isolator without using an actuator, a solenoid valve, a controller, and the like and by changing over the orifices. Therefore, not only can the manufacturing cost be reduced, but also the orifices can be stably opened or closed so that the vibration isolating performance of the vibration isolator is maintained The operation of the vibration isolator according to the seventh aspect of the invention will be described hereinbelow.

The seventh aspect of the invention provides a structure similar to that of the fourth through sixth aspects of the invention, which operates in a similar manner, and it further provides a structure in which the opening and closing member is reciprocatably disposed, and the orifice-forming member which forms the orifice is provided between the main fluid chamber and the fluid sub-chamber; and the guide member is comprised of a shaft portion formed in the central portion of the opening and closing member, and a bearing portion formed in the orifice-forming member.

Thus, according to the present aspect of the invention, the shaft portion formed in the central portion of the opening and closing member and the bearing portion formed in the orifice-forming member having the orifice constitute the guide member, and the opening and closing member makes a reciprocating motion while being guided by the shaft portion and the bearing portion, so that the stable opening and closing of the orifice is more reliably assured.

The operation of the vibration isolator according to the eighth aspect of the invention will be described hereinbelow.

The present apsect of the invention provides a structure similar to that of the fourth through sixth aspects of the invention, which operates in a similar manner, and it further provides a structure in which the opening and closing member is reciprocatably disposed, and the orifice-forming member which forms the orifice is provided between the main fluid chamber and the fluid sub-chamber; and the guide member is comprised of a bearing portion formed in the central portion of the opening and closing member, and a shaft portion formed in the orifice-forming member.

Thus, according to the present aspect of the invention, the bearing portion formed in the central portion of the opening and closing member and the shaft portion formed in the orifice-forming member having the orifice constitute the guide member, thus the opening and closing member makes a reciprocating motion while being specifically guided by the shaft portion and the bearing portion, so that the stable opening and closing of the orifice is more reliably assured as in the seventh aspect of the invention.

The operation of the vibration isolator according to the ninth aspect of the invention will be described hereinbelow.

The The present aspect of the invention provides a structure similar to that of the fourth through sixth aspects of the invention, which operates in a similar manner, and it further provides a structure in which a partition member which partitions between the main fluid chamber and the fluid sub-chamber, and contains the check valve is provided between these main fluid chamber and fluid sub-chamber; and the guide member is comprised of a shaft portion formed in the central portion of the opening and closing member, and a bearing portion formed in the partition member.

Thus, according to the present aspect of the invention, the shaft portion formed in the central portion of the opening and closing member and the bearing portion formed in the partition member containing the check valve constitute the guide member, and the opening and closing member makes a reciprocating motion while being guided by the shaft portion and the bearing portion, so that the stable opening and closing of the orifice being more reliably assured as in the seventh aspect of the invention.

The operation of the vibration isolator according to the tenth aspect of the invention will be described hereinbelow.

The present aspect of the invention provides a structure similar to that of the sourth through sixth aspects of the invention, which operates in a similar manner, and it further provides a structure in which a partition member which partitions between the main fluid chamber and the fluid sub-chamber, and contains the check valve is provided between the main fluid chamber and the fluid sub-chamber; and the guide member is comprised of a bearing portion formed in the central portion of the opening and closing member, and a shaft portion formed in the partition member.

Thus, according to the present aspect of the invention, the bearing portion formed in the central portion of the opening and closing member and the shaft portion formed in the partition member containing the check valve constitute the guide member, thus the opening and closing member makes a reciprocating motion while being guided by the shaft portion and the bearing portion, so that the stable opening and closing of the orifice is more reliably assured as the seventh aspect of the invention.

The operation of the vibration isolator according to the eleventh aspect of the invention will be described hereinbelow.

As is the case with the first aspect of the invention, according to ther eleventh aspect of the invention, when a vibration is transmitted from the vibration generation portion connected to either one of the pair of mounting members, the elastic element is elastically deformed and the vibration is thereby reduced, thus making it difficult for the vibration to be transmitted to the vibration reception portion connected to the other mounting member. Further, the present aspect of the invention also provides a structure in which the opening and closing member is reciprocatably disposed in the space including a portion of the orifice which communicates between the main fluid chamber and the fluid sub-chamber.

In this regard, the present aspect of the invention provides a structure in which the check valve which is disposed between the main fluid chamber and this opening and closing member causes the fluid to flow from the opening and closing member side only to the main fluid chamber, and the elastic member biases the opening and closing member in direction away from the check valve.

And, this check valve is comprised of the valve body formed with an elastic material and the valve seat, and when the opening and closing member is brought close to the valve body, the abutting portion provided in the portion of the opening and closing member that is opposed to the valve body is abutted against the valve body.

The first aspect of the invention provides a structure in which the elastic member biases the opening and closing member toward the check valve, and therewith, when the pressure fluctuation of the fluid in the main fluid chamber is increased, the opening and closing member is moved to the fluid sub-chamber side and blocks the orifice. However, with this structure, even after the orifice has been blocked by the opening and closing member, the opening and closing member produces a minute vibration, while blocking the orifice; thus there is a possibility that the opening and closing member repeats contacting with the member forming the orifice, and the like and generates contact sound.

In order to address the above problems, the eleventh aspect of the invention has adopted a structure in which the opening and closing member is provided with a abutting portion as described above, and the valve body constituting a portion of the check valve is utilized as the member for preventing the opening and closing member from generating contact sound. That is, the check valve is disposed in an orientation reverse to that in the first aspect of the invention, and the elastic member is disposed between the check valve and the opening and closing member so as to permit the check valve to flow the fluid from the opening and closing member side only to the main fluid chamber, with the elastic member being arranged so as to bias the opening and closing member in a direction away from the check valve.

Thus, when the amplitude of the vibration input applied to the vibration isolator is low, and a vibration with a small pressure fluctuation is applied, the opening and closing member is biased by the elastic member so as to be at standstill in the position closer to the fluid sub-chamber, thus resulting in no contact sound being generated. On the other hand, when the amplitude of the vibration input applied to the vibration isolator is increased, the fluid on the opening and closing member side is discharged into the main fluid chamber under the action of the check valve, and the opening and closing member is moved to the main fluid chamber side, so that the opening and closing member shuts off a portion of the orifice, and thus the fluid is prevented from flowing within this orifice. At this time, the abutting portion of the opening and closing member is brought into contact with the valve body formed of an elastic material, so that the abutting sound of the opening and closing member can be reduced.

Further, as in the first aspect of the invention, the vibration isolator according to the eleventh aspect of the invention also can also reduce the vibration over a wide range as with the conventional vibration isolator without using an actuator, a solenoid valve, a controller, and the like and by changing over the orifices. Thus, also according to the eleventh aspect of the invention, the manufacturing cost can be reduced while the vibration isolating performance of the vibration isolator is maintained.

The operation of the vibration isolator according to the twelfth aspect of the invention will be described hereinbelow.

The present aspect of the invention provides a structure similar to that of the eleventh aspect, which operates in a similar manner, and it further provides a structure in which the abutting portion has a shape such that it is protruded toward the valve body. Thus, due to the presence of the abutting portion having such a protruding shape, the opening and closing member is caused to more reliably abutt against the valve body.

The operation of the vibration isolator according to the nineteenth aspect of the invention will be described hereinbelow.

The present aspect of the invention provides a structure similar to that of the first through eighteenth aspects of the invention, which operates in a similar manner, and it further provides a structure in which two orifices exist; one of the orifices which is opened and closed by the opening and closing member is provided as an idle orifice; and the other orifice is provided as a shake orifice which is formed more thinly or more longly than the idle orifice.

In other words, in the present aspect of the invention, two orifices exist; the orifice according to the first through seventeenth aspects of the invention that is opened and closed by the opening and closing member is provided as an idle orifice; and in order to make it possible to reduce the vibration having a high amplitude and a low frequency which cannot be reduced by the idle orifice, having a high amplitude, the other orifice is provided as a shake orifice which is formed more thinly or more longly than the idle orifice.

Thus, even a vibration having a high amplitude and a low frequency which cannot be reduced the idle orifice can be reduced due to the fluid column resonance, the viscous drag, and the like, of the fluid in the shake orifice. As a result of this, even though the vibration inputted has any amplitude and frequency, the fluid is permitted positively flow between the main fluid chamber and the fluid sub-chamber through these two orifices, and thus vibration over a wide range of amplitude and frequency can be reduced.

Meanwhile, in a state in which the idle orifice is opened, the fluid is permitted to flow from the inside of the main fluid chamber to the idle orifice and the shake orifice; however, because the idle orifice is thick and short as compared to the shake orifice, the fluid is predominantly caused to flow between the main fluid chamber and the fluid sub-chamber through the idle orifice, And, when the opening and closing member is moved in a prescribed direction due to the vibration having a high amplitude and a low frequency, this opening and closing member shuts off a portion of the orifice provided as an idle orifice, so that the fluid is positively caused to flow within the shake orifice.

BRIEF DESCRIPTION OF THE DRAWINGS

FIG. 10 is a sectional view of a third embodiment of the vibration isolator according to the present invention, illustrating a state of idle mode;

FIG. 22 is a sectional view of a sixth embodiment of the vibration isolator according to the present invention, illustrating a state of idle mode;

DETAILED DESCRIPTION OF THE INVENTION

Next, a first embodiment of the vibration isolator according to the present invention will be illustrated in FIG. 1 to FIG. 8, and with reference to these drawings, the present embodiment will be described.

Figure 1:
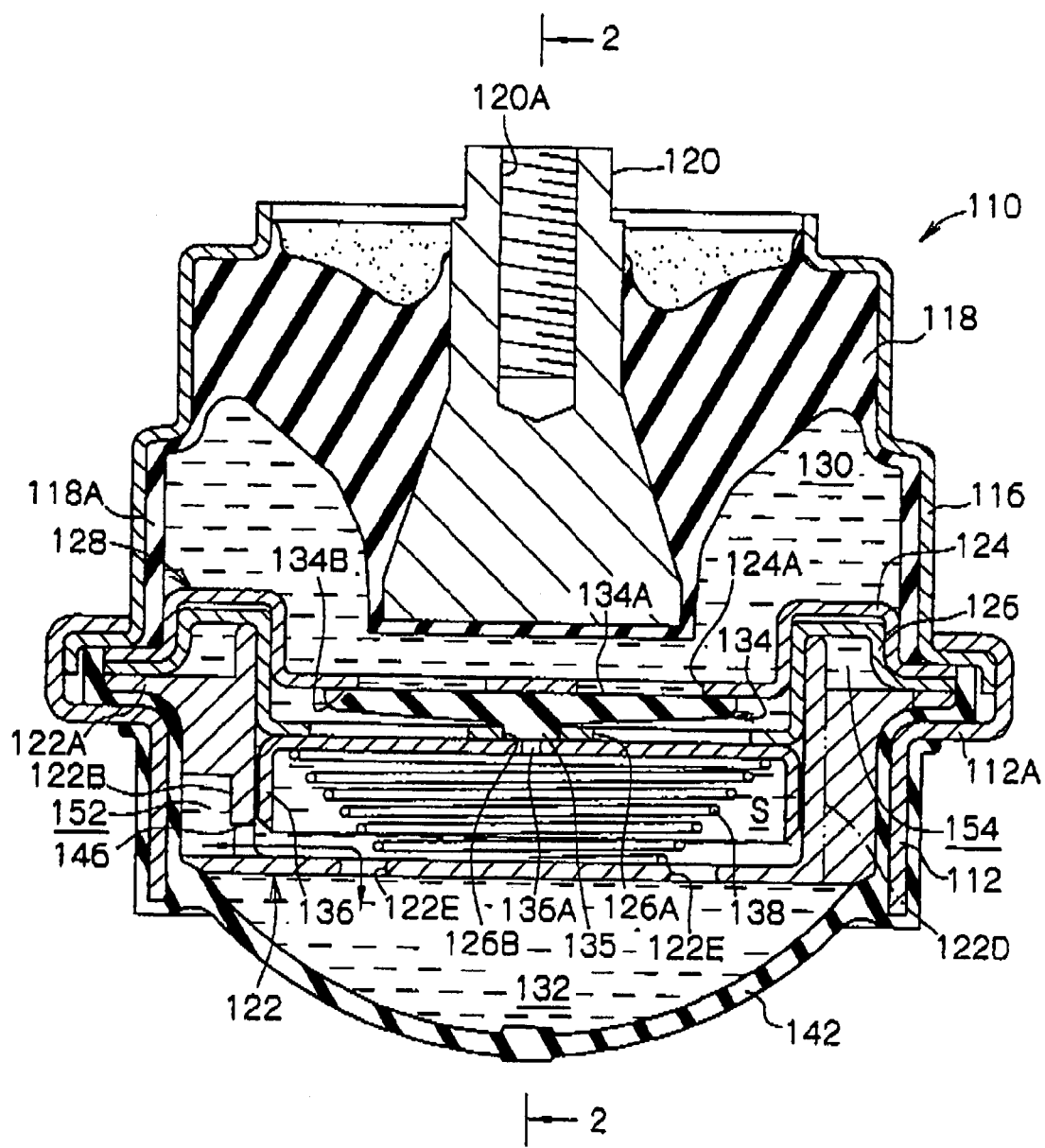
FIG. 1 is a sectional view of a first embodiment of the vibration isolator according to the present invention, illustrating a state of idle mode.
Figure 2:
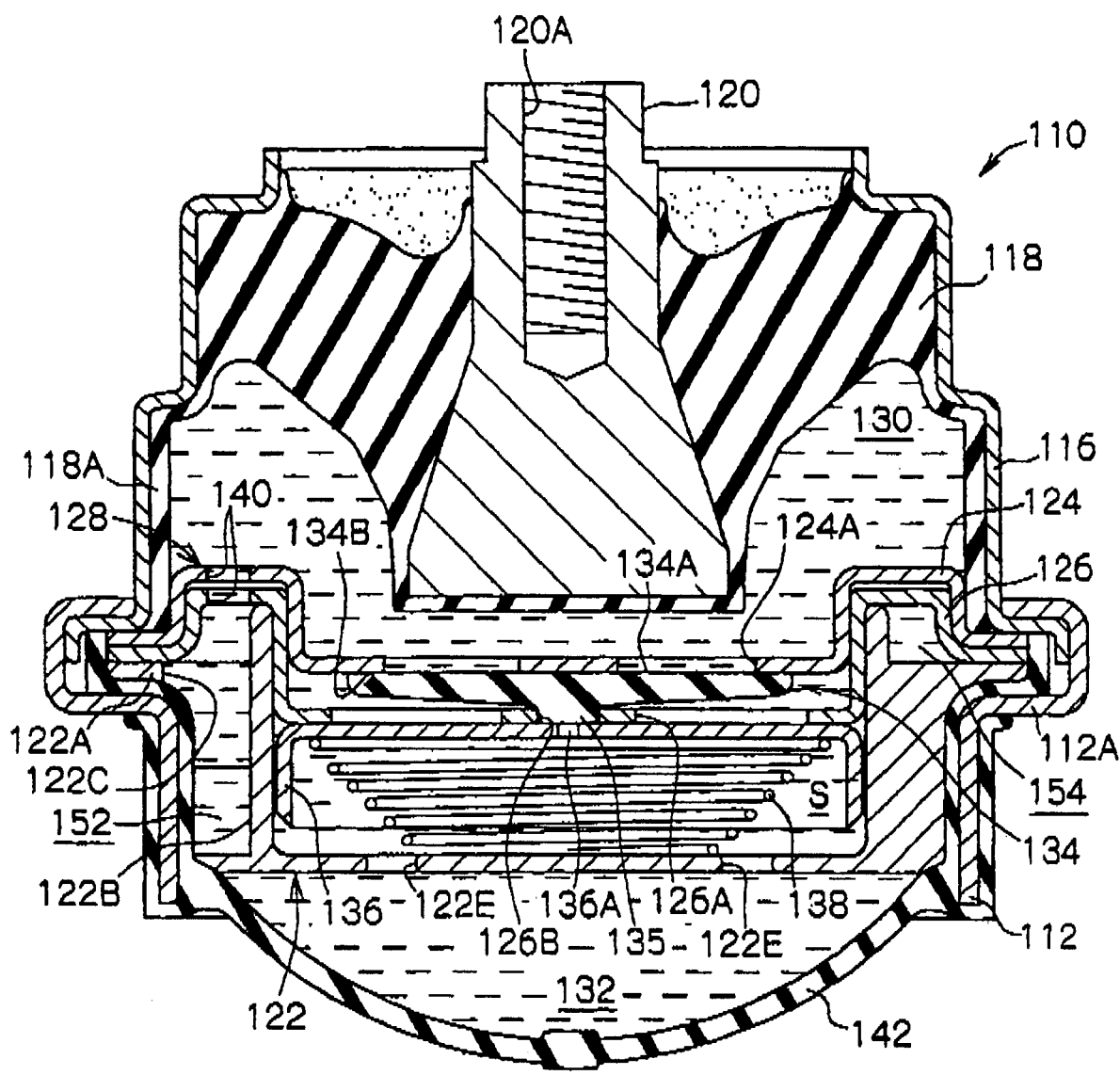
FIG. 2 is a sectional view taken on the line 2-2 in FIG. 1 as viewed in the direction of the arrows.

As shown in FIG. 1 and FIG. 2 representing the present embodiment, a lower outer cylindrical metal fitting 112, i.e., a first mounting member which is cylindrical, having a flange portion 112A flaring toward the outer periphery side in the upper end portion, forms the lower portion of a vibration isolator 110, and through a connection of this lower outer cylindrical metal fitting 112 to a vehicle body (not shown), this vibration isolator 110 is secured to the vehicle body. Further, on an upper portion of this lower outer cylindrical metal fining 112, there is provided an upper outer cylindrical metal fitting 116 which is cylindrical, and whose upper portion is configured so as to have a slightly smaller diameter.

To the inner peripheral surface of this upper outer cylindrical metal fitting 116 is vulcanization-bonded a cylindrically-shaped thin-wall rubber layer 118A made of rubber that forms the lower portion of an elastic element 118, and the central portion on the upper portion side of this elastic element 118 is vulcanization-bonded to a top metal fitting 120, which provides a second mounting member. Further, in the central portion of this top metal fitting 120 is formed a female screw 120A into which a bolt (not shown) to be used for connecting an engine is screwed.

At a position below the elastic element 118 with a space defined with respect thereto, and inside of the lower outer cylindrical metal fitting 112 and the upper outer cylindrical metal fitting 116, a partition member 128 is disposed such that the outer peripheral portion thereof is pinched in a crimped portion between the lower outer cylindrical metal fitting 112 and the upper outer cylindrical metal fitting 116. The space defined by the elastic element 118 and the partition member 128 constitutes a main fluid chamber 130 which is filled with a fluid, such as water, oil, ethylene glycol, or the like. Thus, the partition wall of the main fluid chamber 130 which is filled with the fluid is formed by the elastic element 118 and the partition member 128.

Meanwhile, the partition member 128 is made up of a combination of an upper member 124 and a lower member 126 each of which are formed in a disk-like shape from a synthetic resin or a metal, such as aluminum, or the like. In other words, the upper member 124 constitutes the upper portion of the partition member 128, while the lower member 126 constitutes the lower portion of the partition member 128. The portions of the upper member 124 and the lower member 126 that are closer to the outer periphery thereof are protruded upward in the shape of a ring, and a clearance is defined between the portions of the upper member 124 and the lower member 126 that are closer to the inner periphery thereof, corresponding to the inside of the portions protruded upward.

Figure 7:
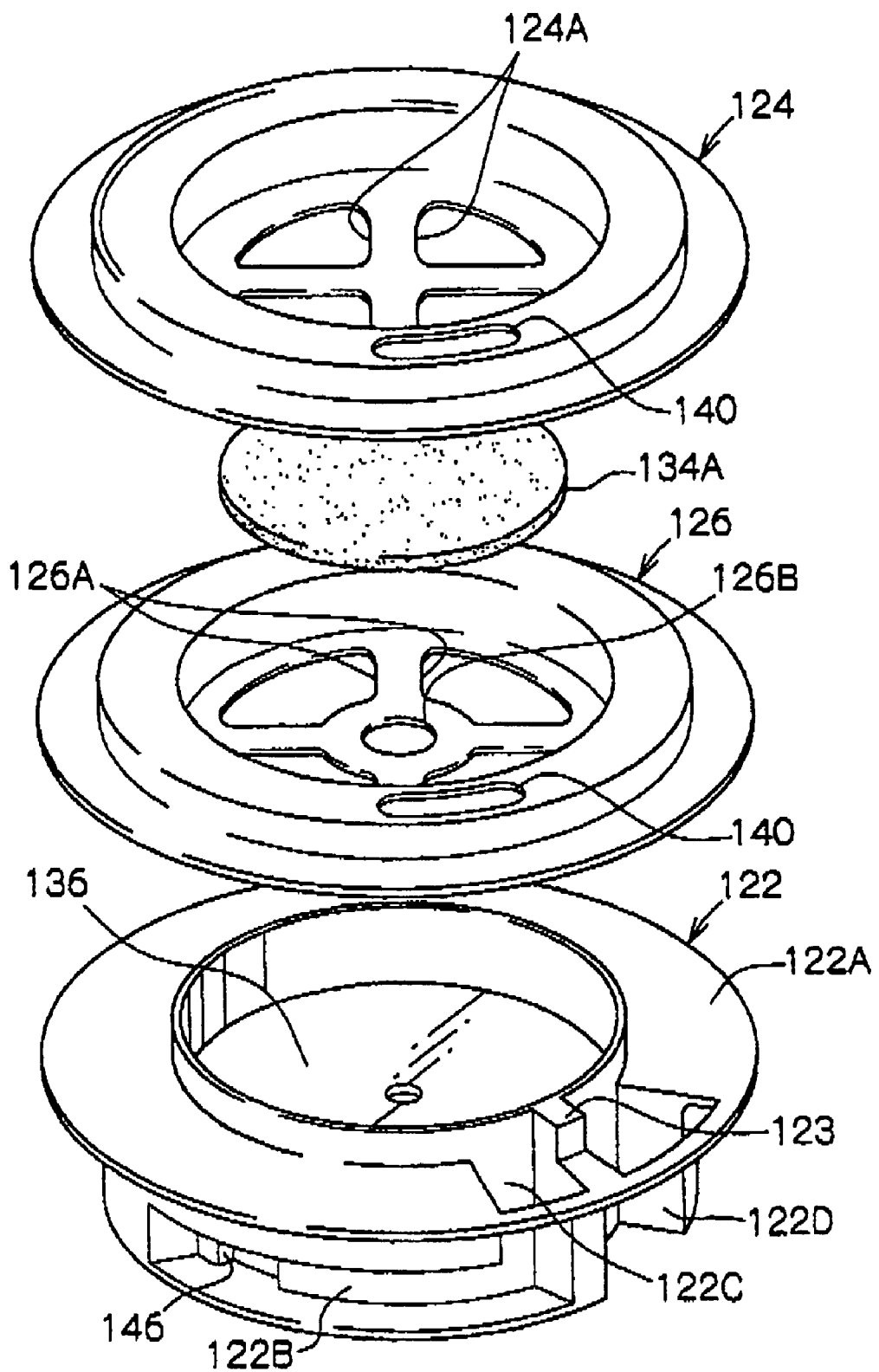
FIG. 7 is an exploded perspective side view of the upper member, the lower member, the orifice-forming member, and the like, which are used in the first embodiment of the vibration isolator according to the present invention.

Further, as shown in FIG. 7, in the portion of this upper member 124 that is closer to the inner periphery thereof, a plurality of through-holes 124A are provided annularly around the center of the upper member 124. In addition, in the portion of this lower member 126 that is closer to the inner periphery thereof, a plurality of through-holes 126A are provided annularly around the center of the lower member 126, and a central hole 126B is provided at the center of the plurality of through-holes 126A in this lower member 126.

Figure 8:
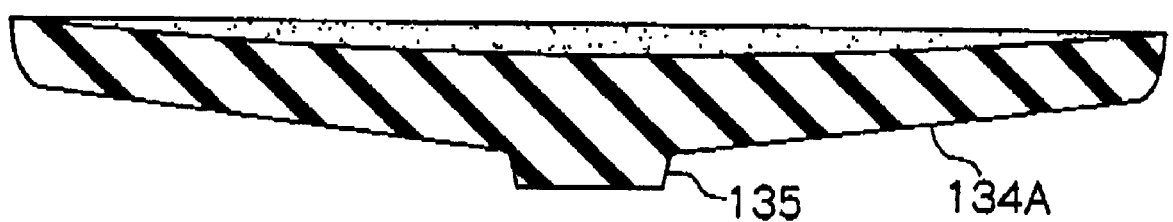
FIG. 8 is a sectional view of a valve body, in a free state, which is used in the first embodiment of the vibration isolator according to the present invention.

In the clearance between the portions of the upper member 124 and the lower member 126 that are closer to the inner periphery thereof, a valve body 134A is disposed which is constructed in the shape of a disk with an elastic material, such as a rubber material, a synthetic resin material, or the like. In other words, in the central portion at the bottom of this valve body 134A, a protrusion portions 135 is provided which is protruded downward, and this protrusion portions 135 is fitted into the central hole 126B provided at the center of the lower member 126 so as to support the valve body 134A. This valve body 134A is formed in the shape of a disk such that a top portion thereof that is closer to the central portion is slightly concaved when the valve body is in a free state as shown in FIG. 8.

Although the thickness of this valve body 134A is made to be slightly smaller than that of the clearance between the upper member 124 and the lower member 126, an adequate preload is applied to this valve body 134A in assembling the vibration isolator 110, and thus the valve body 134A is deformed such that the top of this valve body 134A, in FIG. 1 and FIG. 2, is pressed against the surface of the upper member 124 so as to become substantially flat.

Figure 3:
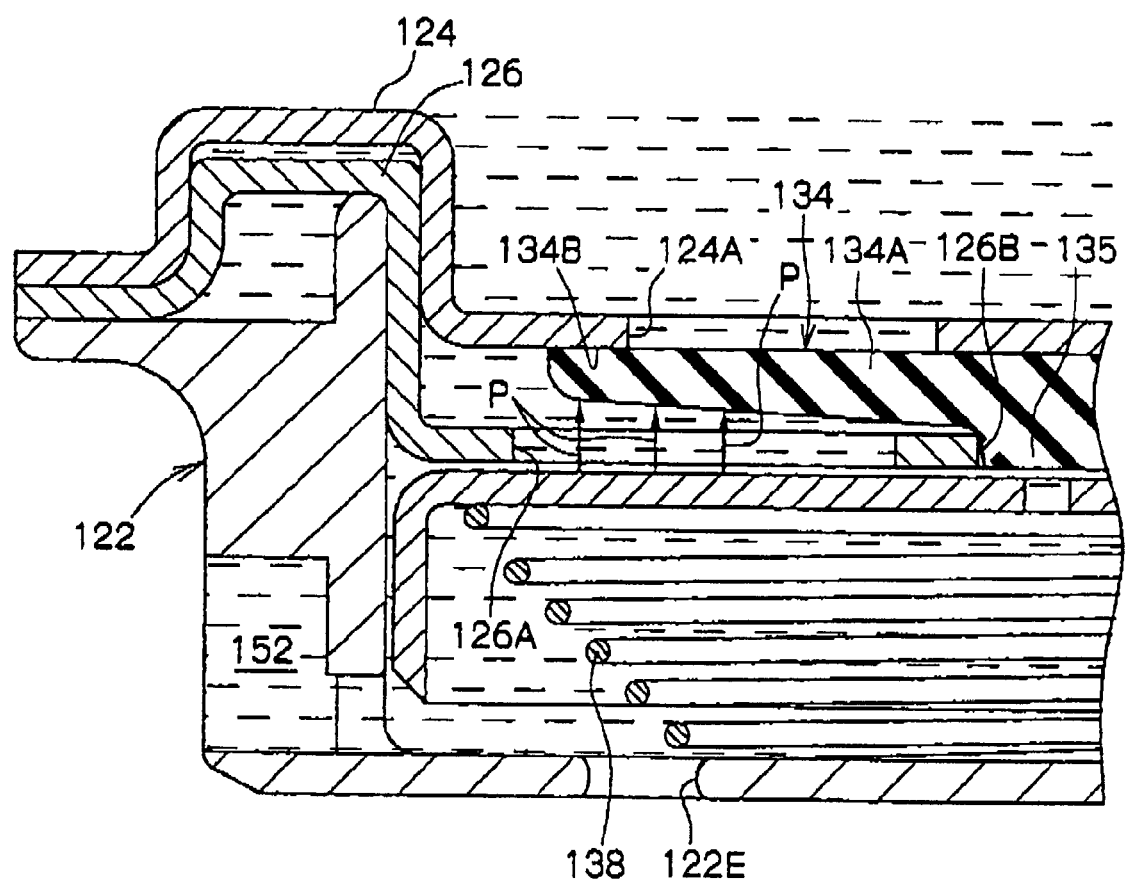
FIG. 3 is an enlarged sectional view of a main portion of FIG. 1.
Figure 4:
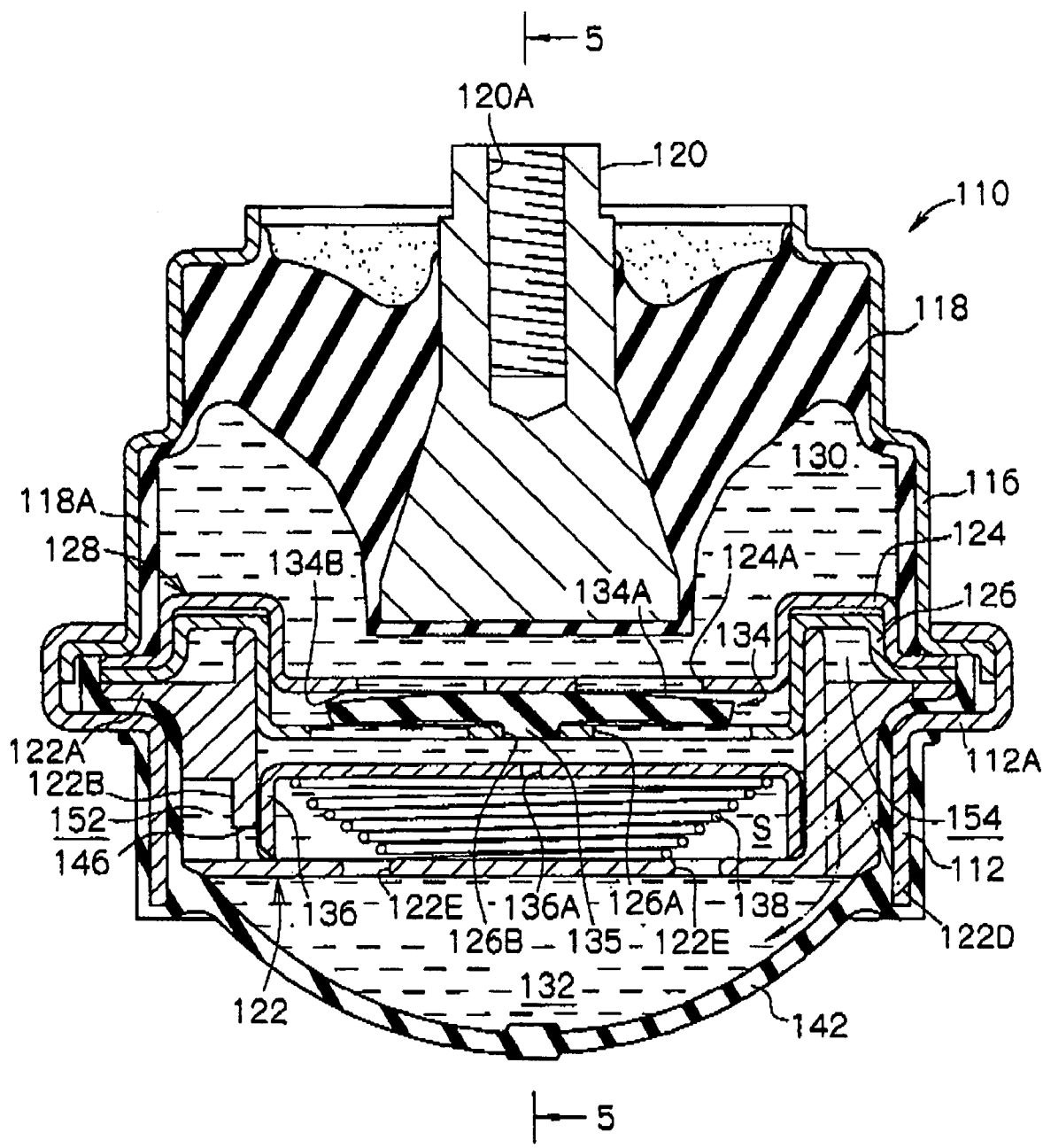
FIG. 4 is a sectional view of the first embodiment of the vibration isolator according to the present invention, illustrating a state of shake mode.
Figure 5:
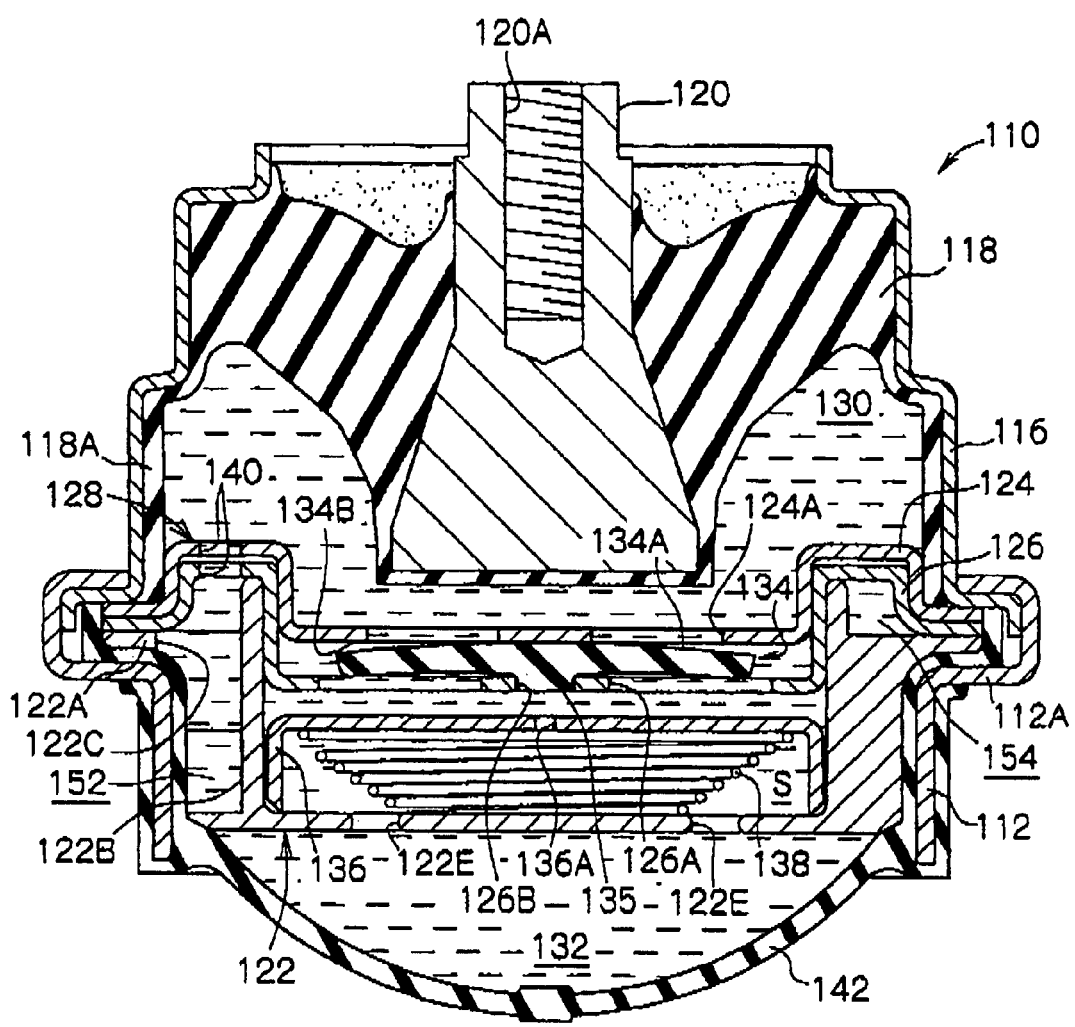
FIG. 5 is a sectional view taken on the line 5-5 in FIG. 4 as viewed in the direction of the arrows.

Further, the outer peripheral portion of the plurality of through-holes 124A in the upper member 124 is formed to be more inside than the outer peripheral edge of the valve body 134A, and when the through-holes 124A of the valve body 134A shown in FIG. 1 to FIG. 3 are closed, the through-holes 124A are completely blocked from below by this valve body 134A. On the other hand, the outer peripheral portion of the plurality of through-holes 126A in the lower member 126 is formed to be more outside than the outer peripheral edge of the valve body 134A, and thus the through-holes 126A will not be completely blocked even when the valve body 134A is deformed as shown in FIG. 4 to FIG. 6.

Figure 6:
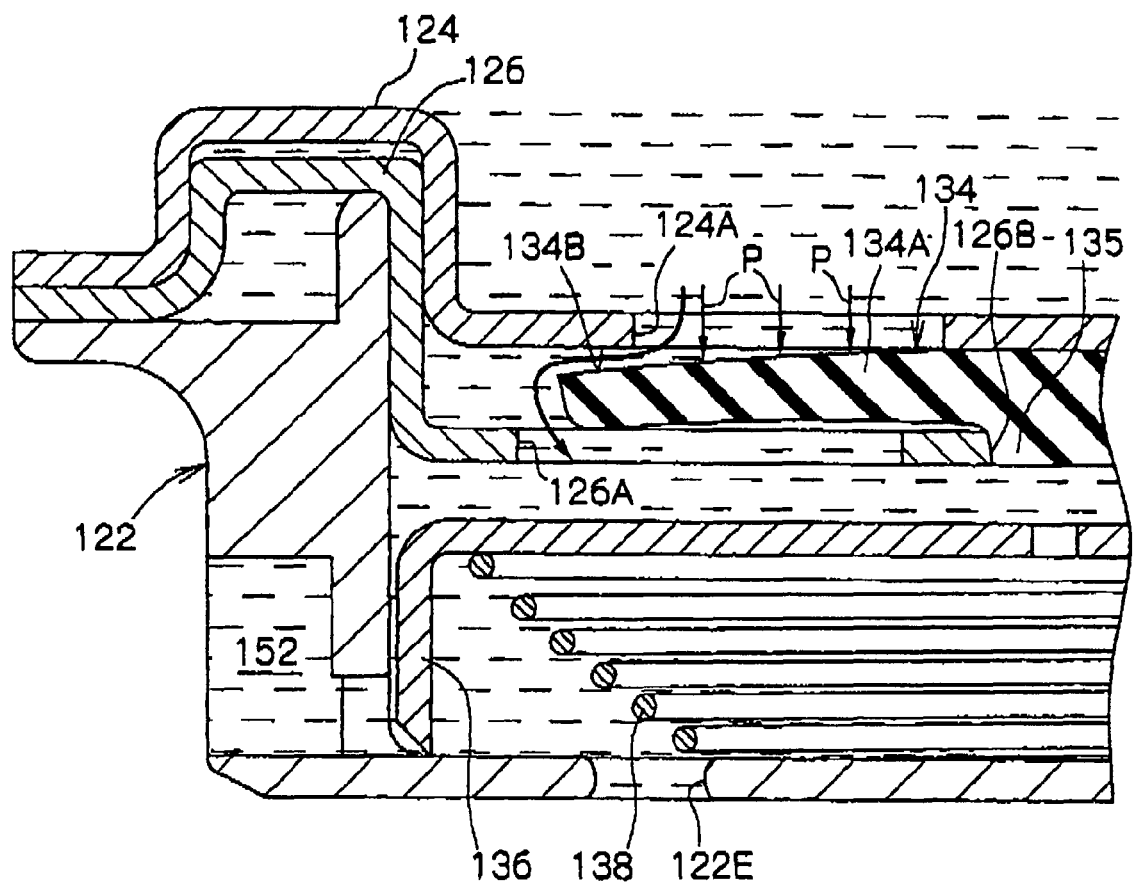
FIG. 6 is an enlarged sectional view of a main portion of FIG. 4.

Therefore, as shown in FIG. 6, when fluid pressure P is applied from above, the portion of the valve body 134A that is closer to the outer periphery thereof is elastically deformed downward, which results in the through-holes 124A being opened so that the fluid is permitted to flow in the direction as shown by an arrow. Further, as shown in FIG. 3, when fluid pressure P is applied from below, the outer peripheral edge of the valve body 134A is strongly abutted against the wall surface around the through-hole 124A under this fluid pressure P, so that the through-holes 124A are positively closed. In other words, the wall surface around the through-hole 124A against which this valve body 134A is abutted serves as a valve seat 134B. In this manner, a check valve 134 is structured which operates more reliably and has a simplified structured wherein the valve body 134A and the valve seat 134B permit the fluid to be flow in only from the main fluid chamber 130 side.

In addition, as shown in FIG. 1 to FIG. 7, under the lower member 126, an orifice-forming member 122 is disposed which is formed in the shape of a cylinder having a bottom. Further, the orifice-forming member 122 is sized such that the inner wall surface thereof is fitted into the portion of the lower member 126 that is protruded upward in the shape of a ring, and the space inside this orifice-forming member 122 provides a cylinder space S.

Further, inside the orifice-forming member 122 is provided a plunger 136 which comprises an opening and closing member formed in the shape of a cylinder having a top portion closed with a metallic material, or the like, for example, in a manner to be slidably engaged with the inner wall surface of the orifice-forming member 122. In the central portion of the plunger 136, a small through-hole 136A is formed to allow the fluid to flow through this through-hole 136A.

Between the bottom of this orifice-forming member 122 and the top of the plunger 136 is provided a coil spring 138, which comprises an elastic member made of a metal, for biasing the plunger 136 upward. That is, the plunger 136 is moved upward while being biased by the coil spring 138, or is moved downward against the biasing force of the coil spring 138.

Here, the coil spring 138 is formed in a helical shape and tapered such that the diameter thereof is increased toward the top and decreased toward the bottom as shown in FIG. 1 and FIG. 2. Thus, even when the coil spring 138 is compressed, the wire turns of the coil spring 138 are prevented from contacting one another. As a result of this, the coil spring 138 can be accommodated in a small space, and there is no possibility that the wire turns of the coil spring 138 contact one another so that the spring constant of the coil spring 138 is nonlinearly increased. Thus, the coil spring 138 has a stable elastic modulus and functions as an elastic member satisfactorily.

Further, by specifying the coil spring 138 as the elastic member among the various types of spring made of a metal, a constant elastic modulus can be substantially permanently secured so that the durability of the vibration isolator 110 is improved, and in addition, the flow path of the fluid can be disposed inside the inner peripheral portion of the coil spring 138 so that the vibration isolator 10 can be further small-sized.

In addition, in the upper portion of the orifice-forming member 122, a pinch-held portion 122A is provided which is protruded toward the outer periphery side in the shape of a flange, and the pinch-held portion 122A is pinched in a crimped portion between the lower portion of the upper outer cylindrical metal fitting 116 and the upper portion of the lower outer cylindrical metal fitting 112 together with the outer peripheral portion of the partition member 128. Thereby, the lower outer cylindrical metal fitting 112, the upper outer cylindrical metal fitting 116, the orifice-forming member 122, and the partition member 128 are secured together.

Further, a rubber material is thinly vulcanization-bonded on the inner and outer peripheral surfaces of the lower outer cylindrical metal fitting 112, and the peripheral edge portion of a diaphragm 142 which comprises an elastic membrane which is made of rubber and elastically deformable, is connected to the lower portion of the rubber material which is vulcanization-bonded to this lower outer cylindrical metal fitting 112. In this manner, the thin diaphragm 142 is disposed under the lower outer cylindrical metal fitting 112, the space between the diaphragm 142 and the bottom of the orifice-forming member 122 forms a fluid sub-chamber 132. The lower portion of the diaphragm 142 is opened to the atmosphere, which facilitates deformation of the diaphragm 142.

On the other hand, between the portion of the lower member 126 that is protruded upward in the shape of a ring and the top of the orifice-forming member 122, there is provided an upper passage which is a space portion in the shape of a ring. In addition, in the portion closer to the bottom of the orifice-forming member 122, a groove portion 122B is formed which extends along the outer periphery of the orifice-forming member 122. The opening portion of this groove portion 122B is closed by the rubber material bonded to the inner peripheral surface of the lower outer cylindrical metal fitting 112, so that a lower passage having an arcuate shape is provided.

Further, a partition wall 123 shown in FIG. 7 is provided on the top of the orifice-forming member 122, and the upper passage is partitioned by this partition wall 123. In the portions of the upper member 124 and the lower member 126 that correspond to the location on the left side, in FIG. 7, of one end of the upper passage partitioned by this partition wall 123, there is provided a first opening portion 140 which connects between the main fluid chamber 130 and the above-mentioned upper passage, as shown in FIG. 2 and FIG. 7.

In the portion of the orifice-forming member 122 that corresponds to the one end of this upper passage, a first communicating hole 122C connecting between that portion and the groove portion 1223 is provided as shown in FIG. 2 and FIG. 7, and in addition, a through portion 146 is formed in the orifice-forming member 122 such that it extrends through the bottom of the groove portion 122B toward the inner periphery side of the orifice-forming member 122.

As a result of this, through this lower passage, the through portion 146, and so forth, the above-mentioned upper passage and the cylinder space S which is the space inside the orifice-forming member 122 are connected to each other. Further, in the portion of the orifice-forming member 122 that corresponds to the bottom outer peripheral portions of the coil spring 138, there are provided second opening portions 122E which connect between the cylinder space S and the fluid sub-chamber 132.

Thus, an idle orifice 152 is formed by the space which connects to the main fluid chamber 130 through the first opening portion 140, which connects to the fluid sub-chamber 132 through the second opening portion 122E, and which communicates between the opening portions through the first communicating hole 122C penetrating the orifice-forming member 122, the through portion 146, and the groove portion 122B. The idle orifice 152 serves as a limiting passage for absorbing idle vibration.

On the other hand, as shown in FIG. 4 and FIG. 7, in the portion of the orifice-forming member 122 that corresponds to the other end of the upper passage partitioned by the partition wall 123, there is provided a second communicating hole 122D which connects between that portion and the fluid sub-chamber 132. Thus, a shake orifice 154 is formed by the passage which is configured such that it connects to the main fluid chamber 130 through the first opening portion 140, and after rounding the upper passage, connects to the fluid sub-chamber 132 through the second communicating hole 122D. The shake orifice 154 serves as a limiting passage for absorbing shake vibration.

As will be appreciated from the above discussion, in the vibration isolator 110 according to the present embodiment, the main fluid chamber 130 and the fluid sub-chamber 132 communicate with each other through the idle orifice 152 and the shake orifice 154. However, when the plunger 136 which is slidably fitted in the cylinder space S is lowered, the idle orifice 152 is closed with the through portion 146 being blocked.

Thus, the plunger 136 is changed in position by being moved between the position where the plunger 136 is raised to open the idle orifice 152 as shown in FIG. 1 to FIG. 3, and the position where the plunger 136 is lowered to close the idle orifice 152 as shown in FIG. 4 to FIG. 6, so that the idle orifice 152 is opened or closed.

Next, the operation of the vibration isolator 110 according to the present embodiment will be described.

When the engine mounted on the top metal fitting 120 is operated, vibration of the engine is transmitted to the elastic element 118 through the top metal fitting 120. The elastic element 118 functions as a main vibration absorbing member and absorbs the vibration by virtue of the vibration dampening capacity based on the internal friction of the elastic element 118 thus making it difficult for the vibration to be transmitted to the vehicle body.

Further, the internal volume of the main fluid chamber 130 with which a portion of the partition wall is formed by the elastic element 118 is changed in response to the elastic element 118 being deformed, thus resulting in a change in the pressure of the fluid in the two orifices 152, 154 which communicate between this main fluid chamber 130 and the fluid sub-chamber 132. Thus, the diaphragm 142 which deformably forms a portion of the partition wall of the fluid sub-chamber 132 is deformed, resulting in the fluid sub-chamber 132 being expanded or contracted, and thus the fluid in the orifices 152, 154 between the main fluid chamber 130 and this fluid sub-chamber 132 is caused to flow.

On the other hand, not only at least the idle orifice 152 of these two orifices 152, 154 is formed by the partition member 128 and the orifice-forming member 122 which are disposed such that they partitioning between the main fluid chamber 130 and the fluid sub-chamber 132, but also the plunger 136 is reciprocatably disposed in the cylinder space S including a portion of this idle orifice 152. And, the check valve 134 which is disposed between the main fluid chamber 130 and this plunger 136 causes the fluid to flow only from the main fluid chamber 130 side to the plunger 136 side, and in addition, the coil spring 138 biases this plunger 136 toward the check valve 134 side.

Thus, because of the elastic element 118 being deformed due to vibration applied to the vibration isolator 110, the main fluid chamber 130 which is filled with the fluid is expanded or contracted so that the internal volume thereof is changed. Further, due to fluid pressure fluctuation caused by the change in the internal volume of the main fluid chamber 130, the plunger 136 is reciprocated in the vertical direction in the cylinder space S so that the through portion 146 is opened and closed, which results in the idle orifice 152 being opened and closed.

As a result of this, when vibration is transmitted from the engine, the vibration is damped due to not only the elastic deformation of the elastic element 118, but also the damping action on the basis of the viscous drag on the flow of the fluid, the fluid column resonance, and the like, in the orifices 152, 154 connecting between the main fluid chamber 130 and the fluid sub-chamber 132, thus making it difficult for the vibration to be transmitted to the vehicle body. Further, as a result of providing the idle orifice 152 which is opened and closed by the vertical motion of the plunger 136, in addition to the shake orifice 154 which is normally opened, the following functions are provided.

Hereinbelow, the operation of the vibration isolator 110 according to the present embodiment will be specifically described.

For example, when an idle vibration is applied to the vibration isolator 110, the pre-compression load on the coil spring 138 for biasing the plunger 136 toward the check valve 134 side is higher than the force generated by the fluid pressure fluctuation in the main fluid chamber 130, and thus, the check valve 134 is brought into the closed state, as shown in FIG. 1 and FIG. 2. Consequently, the plunger 136 is pushed upward by the coil spring 138, this plunger 136 being at standstill in the upward position in the cylinder space S.

Further, with the plunger 136 being at standstill in the upward position in the cylinder space S and the through portion 146 being opened, the fluid having passed through the through portion 146 and the second opening portion 122E is permitted to flow in this cylinder space S, so that an open state in which the idle orifice 152 is opened is established. Thus, the main fluid chamber 130 and the fluid sub-chamber 132 communicate with each other through the idle orifice 152 so that the fluid is permitted to flow in and out through the idle orifice 152. As a result of this, the fluid causes a fluid column resonance or the like in the idle orifice 152, resulting in the dynamic spring constant for the vibration isolator 110 being reduced, and thus the idle vibration being absorbed.

On the other hand, when a shake vibration is applied to the vibration isolator 110, the force generated due to fluid pressure fluctuation in the main fluid chamber 130 is increased in excess of the pre-compression load on the coil spring 138, so that the fluid is caused to flow in from the main fluid chamber 130 in response to the outer peripheral side of the valve body 134A being elastically deformed. Further, under the pressure of this fluid, the plunger 136 is moved downward, i.e., toward the coil spring 138 side against the biasing force of the coil spring 138 as shown in FIG. 4 and FIG. 5, until it abutts against the bottom of the orifice-forming member 122 so as to be at standstill.

Thus, the through portion 146 is blocked by the outer peripheral portion of the plunger 136, and a closed state of the idle orifice 152 occurs in which a portion of the idle orifice 152 is reliably shut off so that the main fluid chamber 130 and the fluid sub-chamber 132 are caused to communicate with each other only through the shake orifice 154. As a result of this, the fluid positively flows in and out through the shake orifice 154 and is subjected to a passing resistance or produces a fluid column resonance so that the shake vibration is absorbed.

Thereafter, when the amplitude of the vibration imparted to the vibration isolator 110 is reduced again, the valve body 134A is closed so that the fluid is caused to flow through the trough-hole 136A extending through the plunger 136 and the clearance between the inner peripheral surface of the orifice-forming member 122 and the plunger 136. Thus, the plunger 136 is again returned to the upward position in the cylinder space S as shown in FIG. 1 and FIG. 2.

On the other hand, in the present embodiment, as shown in FIG. 8, the valve body 134A is formed by an elastic material wherein the surface in opposition to the main fluid chamber 130 is concave. The valve body 134 is disposed between the upper member 124 and the lower member 126 in a state such that a preload is applied toward the main fluid chamber 130 side so that the surface of the valve body 134 in opposition to the main fluid chamber 130 is pressed against the valve seat 134B.

That is, the check valve 134 of the present embodiment has a simple structure which simply utilizes the elasticity of the valve body 134 formed of an elastic material, so that the check valve 134 is not only capable of being reliably opened or closed when needed but also the durability of the check valve 134 and the volume productivity of the vibration isolator 110 is increased. Accordingly, in the present embodiment, the elastic material constituting the valve body 134 uses a rubber material or a synthetic resin material so that the valve body 134 which is reliably elastically deformed can be obtained at low cost.

As will be appreciated from the above description, in the vibration isolator 110 according to the present embodiment, there are provided the idle orifice 152 which is opened and closed by the plunger 136, and the shake orifice 154 which is capable of reducing the vibration having a high amplitude and a low frequency which cannot be reduced by the idle orifice 152, and the manufacturing cost can be reduced while the vibration isolating performance is maintained.

Next, a second embodiment of the vibration isolator according to the present invention will be illustrated in FIG. 9, and with reference to this figure, the present embodiment will be described. The members which have been described in the first embodiment will be provided with the same signs, and a further description thereof will be omitted.

Figure 9:
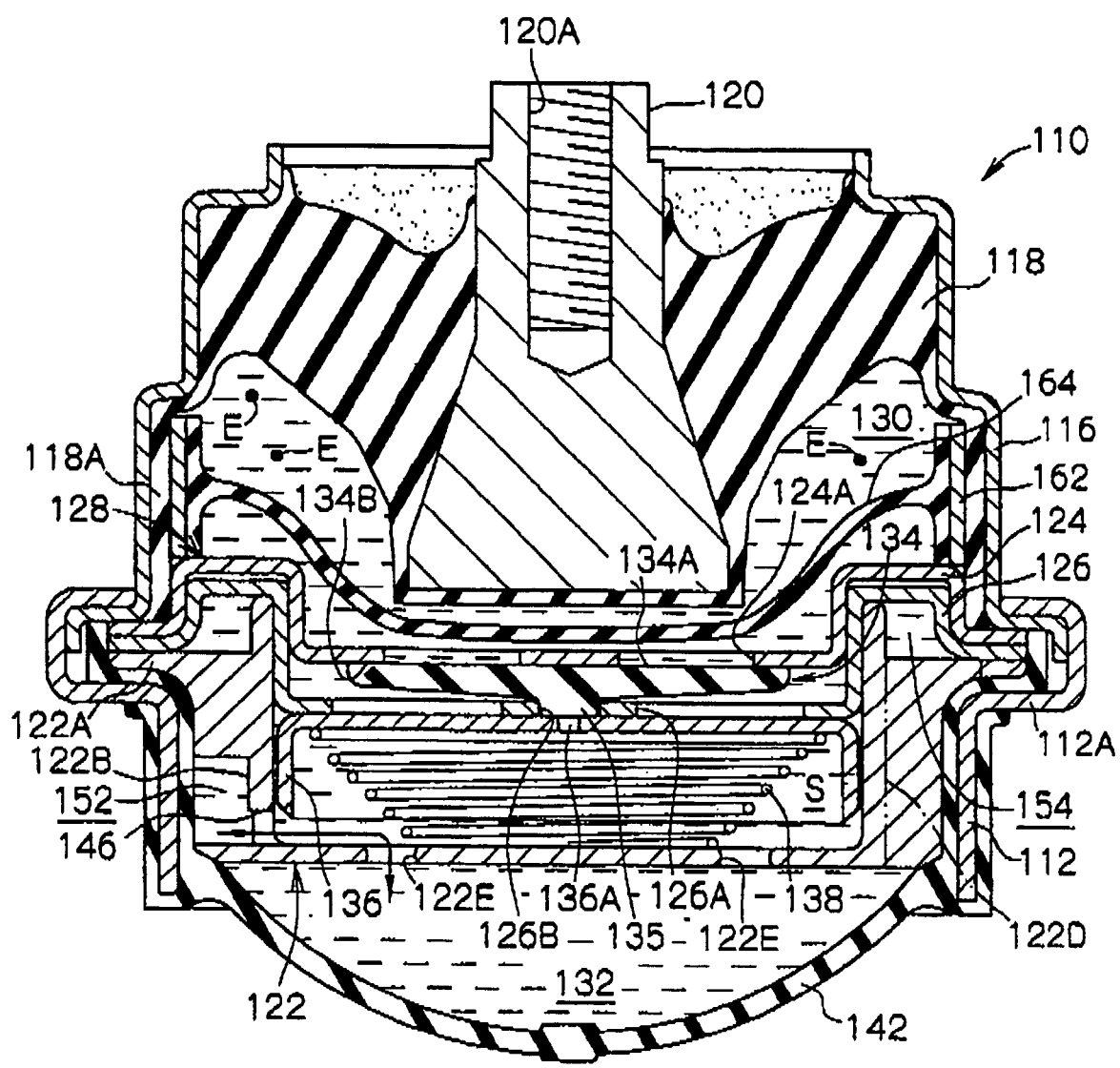
FIG. 9 is a sectional view of a second embodiment of the vibration isolator according to the present invention, illustrating a state of idle mode.

As shown in FIG. 9, the present embodiment also has substantially the same structure as the first embodiment, except that a support ring 162 which is made of a metal, and formed in the shape of a ring is fitted to the inner peripheral surface of the thin rubber layer 118A which forms the inner wall of the main fluid chamber 130 of the present embodiment, and the outer peripheral portion of a membrane member 164 which is formed in the shape of a membrane using a rubber material is vulcanization-bonded to the support ring 162. Thus, in the present embodiment, the membrane member 164 vertically divides the main fluid chamber 130.

In other words, it has been considered that, if this membrane member 164 were not provided, foreign matters E, such as rubber debrises, of the elastic element 118 would be included into the fluid, when the elastic element 118 has been degraded with age, and those foreign matters E would get into the opening and closing mechanism of the idle orifice 152 comprising the check valve 134, the plunger 136, and so forth. Therewith, there has been the possibility that such foreign matters E impede the vertical movement of the plunger 136, and make it difficult to carry out opening and closing of the idle orifice 152 under the traveling conditions.

In contrast thereto, since providing the main fluid chamber 130 is vertically divided due to the presence of the membrane member 164 as mentioned above, it is possible to surely prevent foreign matters E, such as rubber debrises, from being included into the opening and closing mechanism for the idle orifice 152 that is located under the main fluid chamber 130, so that the idle orifice 152 can be reliably opened and closed over a long period of time.

Next, a third embodiment of the vibration isolator according to the present invention will be illustrated in FIG. 10 to FIG. 12, and with reference to these figures, the present embodiment will be described. The members which have been described in the first embodiment will be provided with the same signs, and a further description thereof will be omitted.

Figure 11:
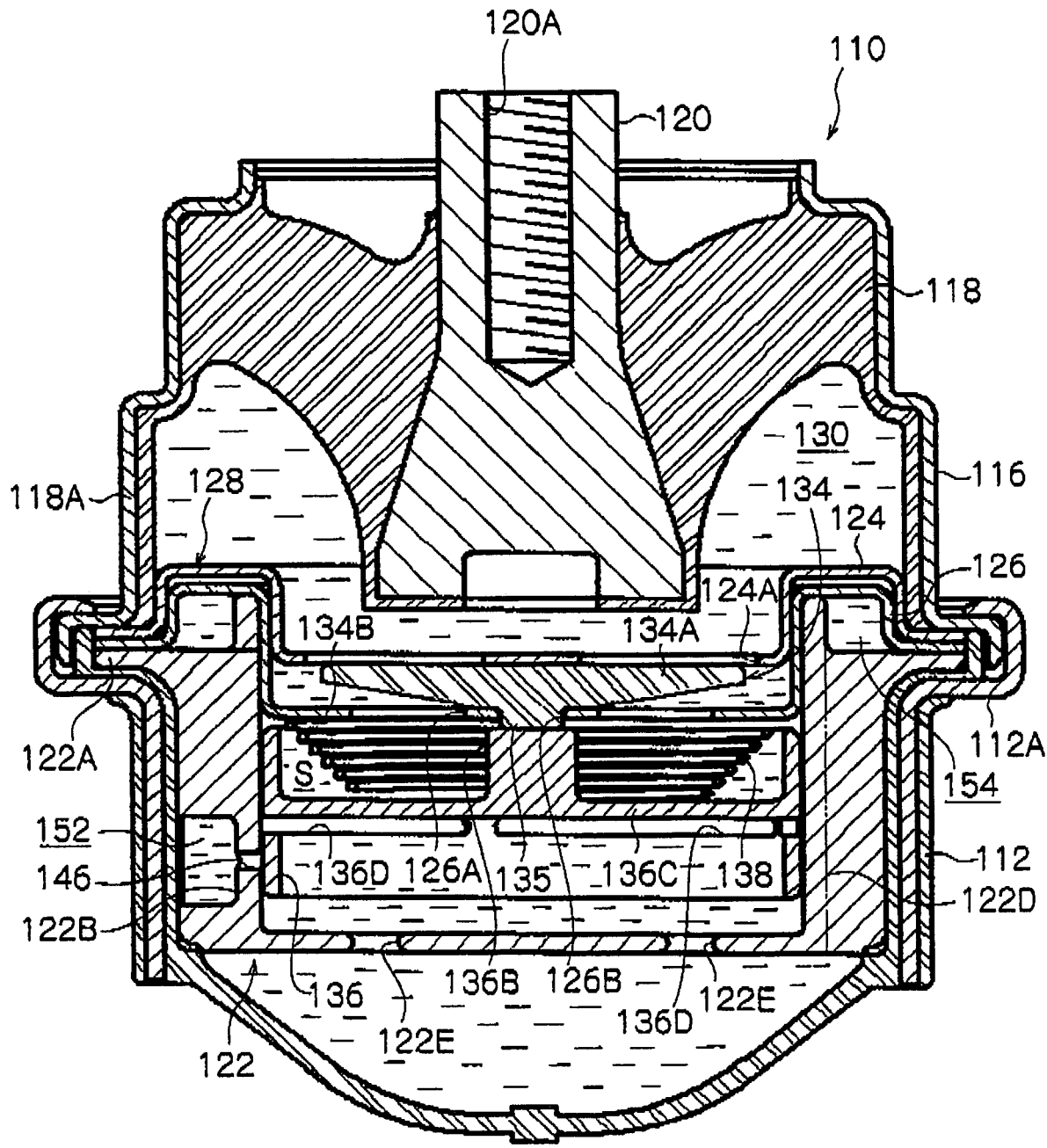
FIG. 11 is a sectional view of the third embodiment of the vibration isolator according to the present invention, illustrating a state of shake mode.

As shown in FIG. 10 and FIG. 11, the vibration isolator 110 according to the present embodiment also has substantially the same structure as the first embodiment, and the plunger 136 is reciprocatably disposed in the cylinder space S including a portion of the idle orifice 152 which communicates between the main fluid chamber 130 and the fluid sub-chamber 132.

However, in the present embodiment, the valve body 134A is formed in the shape of a disk in which the portion closer to the central portion on the bottom is slightly concave in a free state. Thus, the check valve 134 is oriented in a direction opposite to the second embodiment. And, as in the second embodiment, an appropriate preload is applied to this valve body 134 in assembling of the vibration isolator 110, and thus the valve body 134 is deformed such that the bottom of this valve body 134 is pressed against the surface of the lower member 126 to so as be substantially flat, as shown in FIG. 10.

Further, in the present embodiment, the outer peripheral portion of the plurality of through-holes 126A in the lower member 126 is formed to be more outside than the outer peripheral edge of the valve body 134, and when the valve body 134A closes the through-holes 126A as shown in FIG. 10, the through-holes 126A are completely blocked from above by this valve body 134A. On the other hand, the outer peripheral portion of the plurality of through-holes 124A in the upper member 124 is formed so as to be more outside than the outer peripheral edge of the valve body 134, and thus the through-holes 124A will not be completely blocked even when the valve body 134 is deformed as shown in FIG. 11. In this manner, the present embodiment provides a structure in which the check valve 134 causes the fluid to flow from the plunger 136 side only to the main fluid chamber 130.

However, in the central portion of the bottom of this valve body 134, the protrusion portions 135 is provided which protrudes downward such that it is formed slightly longer than that in the second embodiment, and this protrusion portion 135 not only fits into the central hole 126B provided at the center of the lower member 126, but also the tip portion protrudes downward from this central hole 126B.

Figure 12:
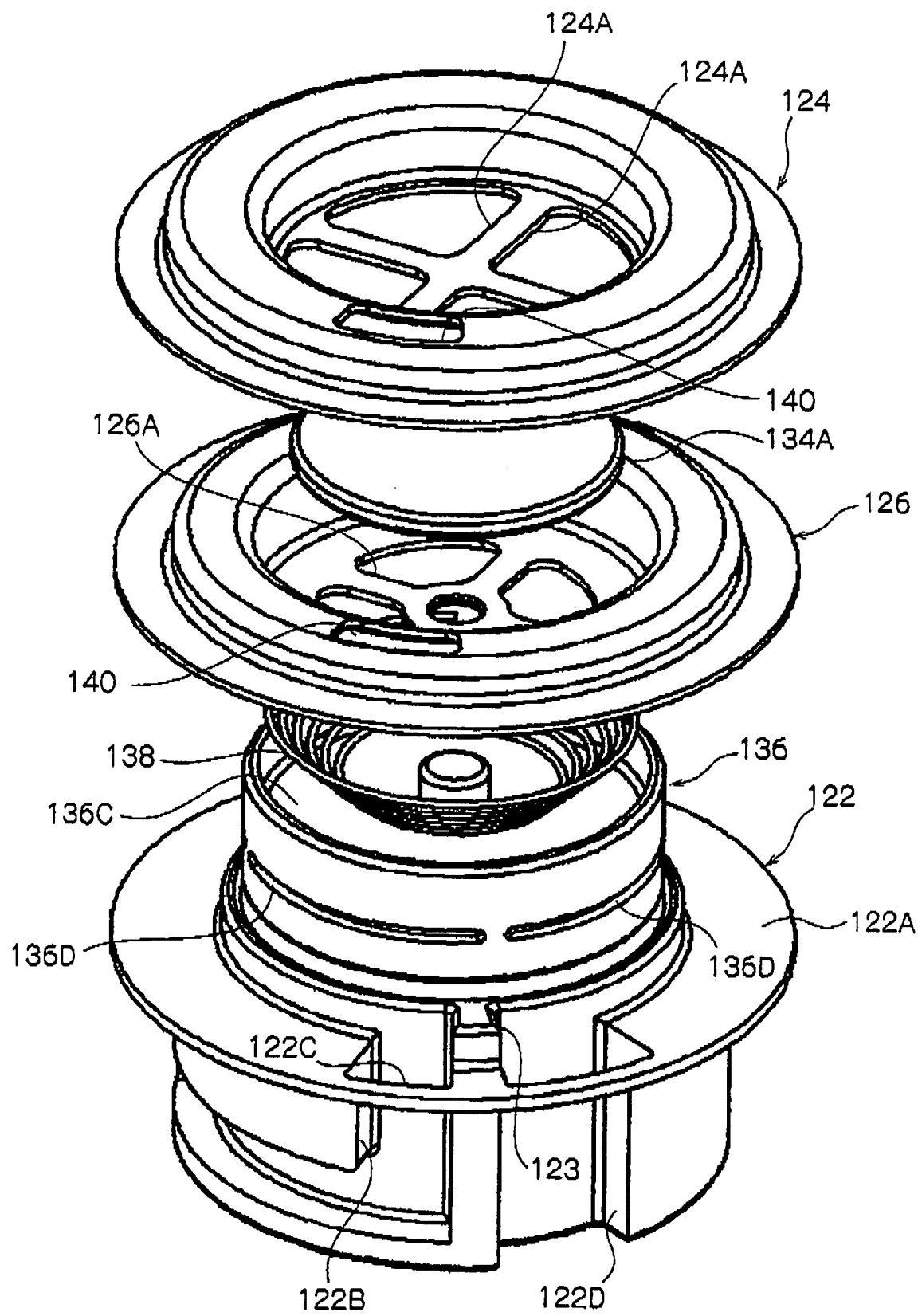
FIG. 12 is an exploded perspective side view of the upper member, the lower member, the plunger, the orifice-forming member, and the like, which are used in the third embodiment of the vibration isolator according to the present invention.

On the other hand, in the present embodiment, as shown in FIG. 12, the plunger 136 is cylindrically formed, and inside thereof, a partitioning portion 136C is provided so as to define a space on the upper portion side and a space on the lower portion side. Further, an abutting portion 136B protruding upward is provided in the central portion of this partitioning portion 136C. In addition, the plunger 136 is provided with communication openings 136D in the shape of a slit which are adapted for communication between the inside and outside of the plunger 136, slightly below the partitioning portion 136C. Between the partitioning portion 136C of the plunger 136 and the check valve 134, a coil spring 138 is disposed. Therefore, in the present embodiment, the coil spring 138 biases the plunger 136 in a direction away from the check valve 134.

Further, also in the present embodiment, a through portion 146 is formed in the orifice-forming member 122 such that it penetrates through the bottom of the groove portion 122B provided in the orifice-forming member 122 toward the inner periphery side of the orifice-forming member 122, however, this through portion 146 is disposed in a location closer to the top of the orifice-forming member 122 than that in the first embodiment.

As will be appreciated from the above description, the present embodiment provides a structure in which the check valve 134 disposed between the main fluid chamber 130 and the plunger 136 causes the fluid to flow from the plunger 136 side only to the main fluid chamber 130, and in addition, the coil spring 138 biases the plunger 136 in a direction away from the check valve 134. The check valve 134 is comprised of the valve body 134A formed from an elastic material and the valve seat 134B, and when the plunger 136 is brought close to the valve body 134A, the abutting portion 136B provided in the portion of the plunger 136 that is opposed to the valve body 134A is abutted against the protrusion portions 135 of the valve body 134A.

Thus, in the present embodiment, when the amplitude of the vibration input applied to the vibration isolator 110 is low, and an idle vibration with a low pressure fluctuation is applied, the plunger 136 is biased by the coil spring 138 so as to be at standstill in a position closer to the fluid sub-chamber 132 as shown in FIG. 10, thus resulting in no contact sound being generated. And therewith, the through portion 146 is brought into alignment with the communicating opening 136D of the plunger 136 so as to be opened so that the idle orifice 152 is opened.

On the other hand, when the amplitude of the vibration input applied to the vibration isolator 110 is increased, the fluid on the plunger 136 side is discharged into the main fluid chamber 130 by the action of the check valve 134, so that the plunger 136 is moved to the main fluid chamber 130 side, as shown in FIG. 11, as a result of which the through portion 146 is blocked by the plunger 136 so that the idle orifice 152 is closed, and thus the idle mode is changed to the shake mode. At this time, the abutting portion 136B of the plunger 136 is brought into contact with the protrusion portions 135 of the valve body 134A formed from an elastic material, thereby decreasing the abutting sound of the plunger 136.

Because of the abutting portion 136B being configured in a shape protruding toward the valve body 134A as in the present embodiment, the plunger 136 is still more reliably abutted against the valve body 134A. In the present embodiment, the abutting portion 136B is provided in the central portion of the plunger 136, thus the through-hole 136A is disposed in the portion which is opposed to the second opening portion 122E.

As a result of what has been mentioned above, the vibration isolator 110 according to the present embodiment can also change over the orifice, as in the first embodiment, to reduce the vibration over a wide range as with the conventional vibration isolator 110, without the need for using an actuator, a solenoid valve, a controller, and the like. Therefore, also with the present embodiment, the manufacturing cost can be reduced, while the vibration isolating performance is maintained, and in addition, the contact sound of the plunger 136 can be prevented from being generated.

Meanwhile, in the above-mentioned embodiment, the top plate metal fitting 20 or the top metal fitting 120 is connected to the engine, which is a vibration generating portion, and the bottom plate 12 or the lower outer cylindrical metal fitting 112 is connected to the vehicle body, which is the vibration receiving portion, however, a reverse configuration may be used.

In addition, in the above-mentioned first to third embodiments, the valve body constituting the check valve is formed in a shape in which the portion closer to the central portion on one surface is slightly concave in a free state. However, instead of this, the valve body may be formed in a flat shape, and for example, the upper member, i.e., the metal fitting against which the valve body is to be abutted may be formed in a shape such that it is convex toward the main fluid chamber side so that an appropriate preload is applied to the valve body when the vibration isolator is assembled.

Further, although in the above-mentioned embodiments, the present invention have been purposed for vibration isolation for a motor vehicle engine or the like, the vibration isolator of the present invention can, of course, be used for other applications, and the geometry and the like are not limited to those as given in the embodiments, the present invention being equally applicable to the vibration isolators having a different structure.

Next, a fourth embodiment of the vibration isolator according to the present invention will be illustrated in FIG. 13 to FIG. 20, and with reference to these figures, the present embodiment will be described.

Figure 13:
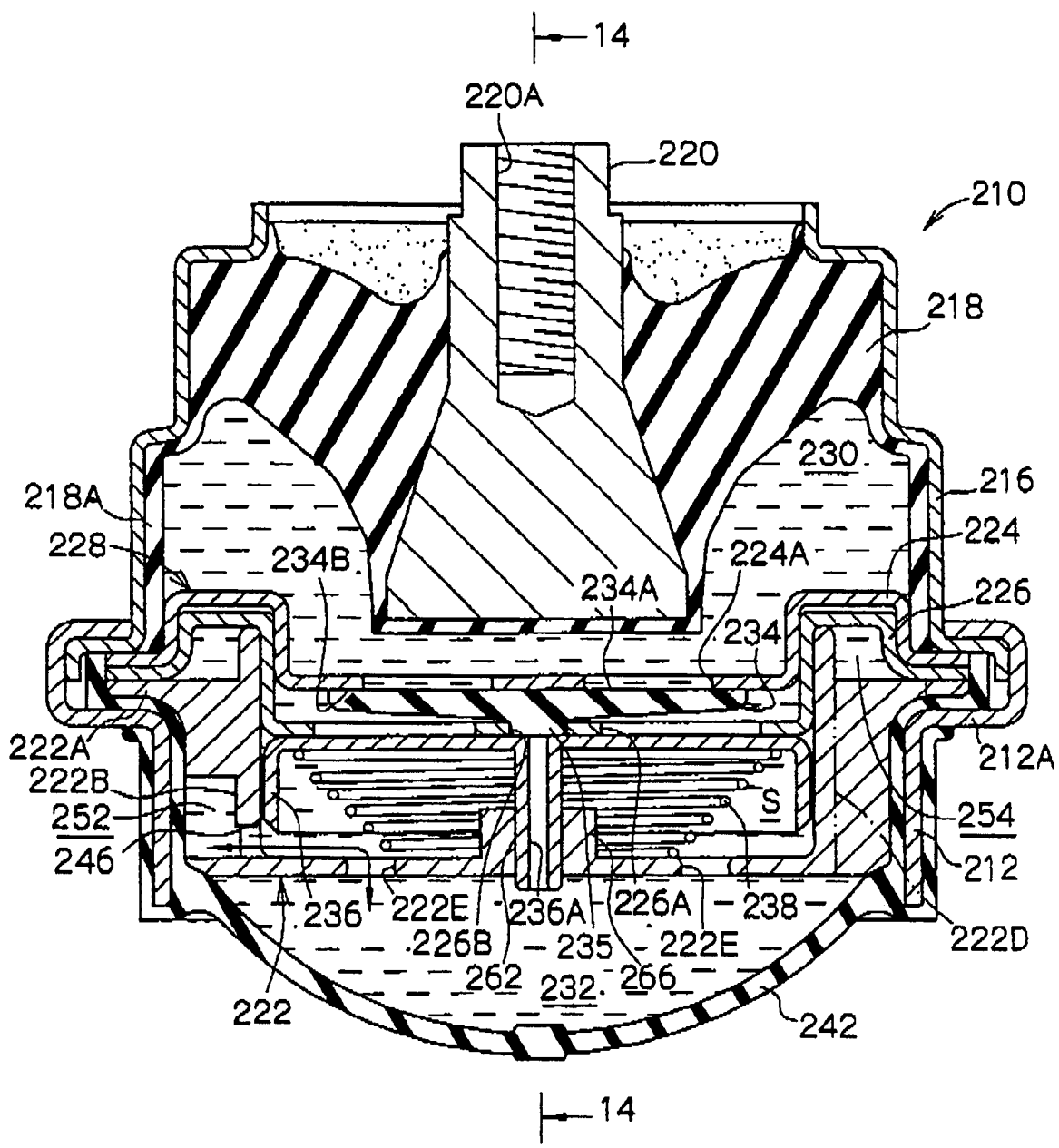
FIG. 13 is a sectional view of a fourth embodiment of the vibration isolator according to the present invention, illustrating a state of idle mode.
Figure 14:
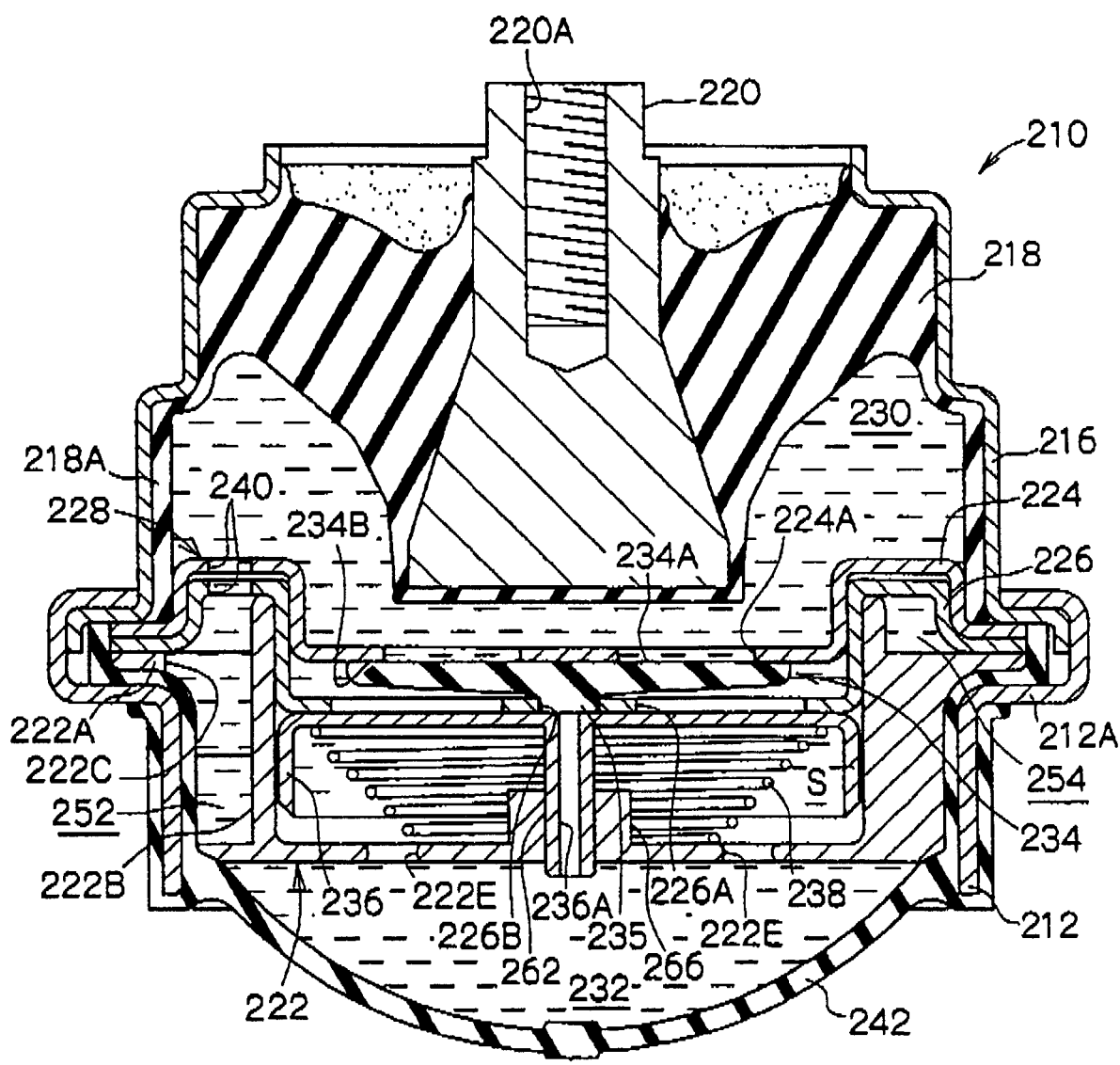
FIG. 14 is a sectional view taken on the line 13-13 in FIG. 13 as viewed in the direction of the arrows.

As shown in FIG. 13 and FIG. 14 representing the present embodiment, a lower outer cylindrical metal fitting 212, which is a first mounting member formed in a cylindrical shape having a flange portion 212A flaring toward the outer periphery side at the upper end, forms the lower portion of a vibration isolator 210, and through a connection of the lower outer cylindrical metal fitting 212 to a vehicle body (not shown), the vibration isolator 210 is secured to the vehicle body. Further, on the lower outer cylindrical metal fitting 212 is disposed an upper outer cylindrical metal fitting 216 which is formed in a cylindrical shape such that an upper portion thereof has a slightly smaller diameter.

Onto the inner peripheral surface of this upper outer cylindrical metal fining 216 is vulcanization-bonded a cylindrically-shaped thin rubber layer 218A made of rubber that forms the lower portion of an elastic element 218, and the central portion on the upper portion side of this elastic element 218 is vulcanization-bonded to a top metal fitting 220 which provides a second mounting member. And, in the central portion of the top metal fitting 220 is formed a female screw 220A into which an engine conneting bolt (not shown) is screwed.

In a position below and spaced apart from the elastic element 218 and inside of the lower outer cylindrical metal fitting 212 and the upper outer cylindrical metal fitting 216, a partition member 228 is disposed such that the outer peripheral portion thereof is pinched in a crimped portion between the lower outer cylindrical metal fitting 212 and the upper outer cylindrical metal fitting 216, the space defined by the elastic element 218 and the partition member 228 constitutes a main fluid chamber 230 which is filled with a fluid, such as water, oil, ethylene glycol, or the like. Thus, the partition wall of the main fluid chamber 230 which is filled with the fluid is comprised of the elastic element 218 and the partition member 228.

Meanwhile, the partition member 228 is made up of a combination of an upper member 224 and a lower member 226 each of which is formed in a disk-like shape from a synthetic resin or a metal such as aluminum or the like. That is, the upper member 224 constitutes an upper portion of the partition member 228, while the lower member 226 constitutes a lower portion of the partition member 228. The portions of the upper member 224 and the lower member 226 that are closer to the outer periphery thereof are each protruded upward in a ring-like shape, and a clearance is defined between the portions of the upper member 224 and the lower member 226 that are closer to the inner periphery thereof, corresponding to the inside of the portions protruded upward.

Figure 19:
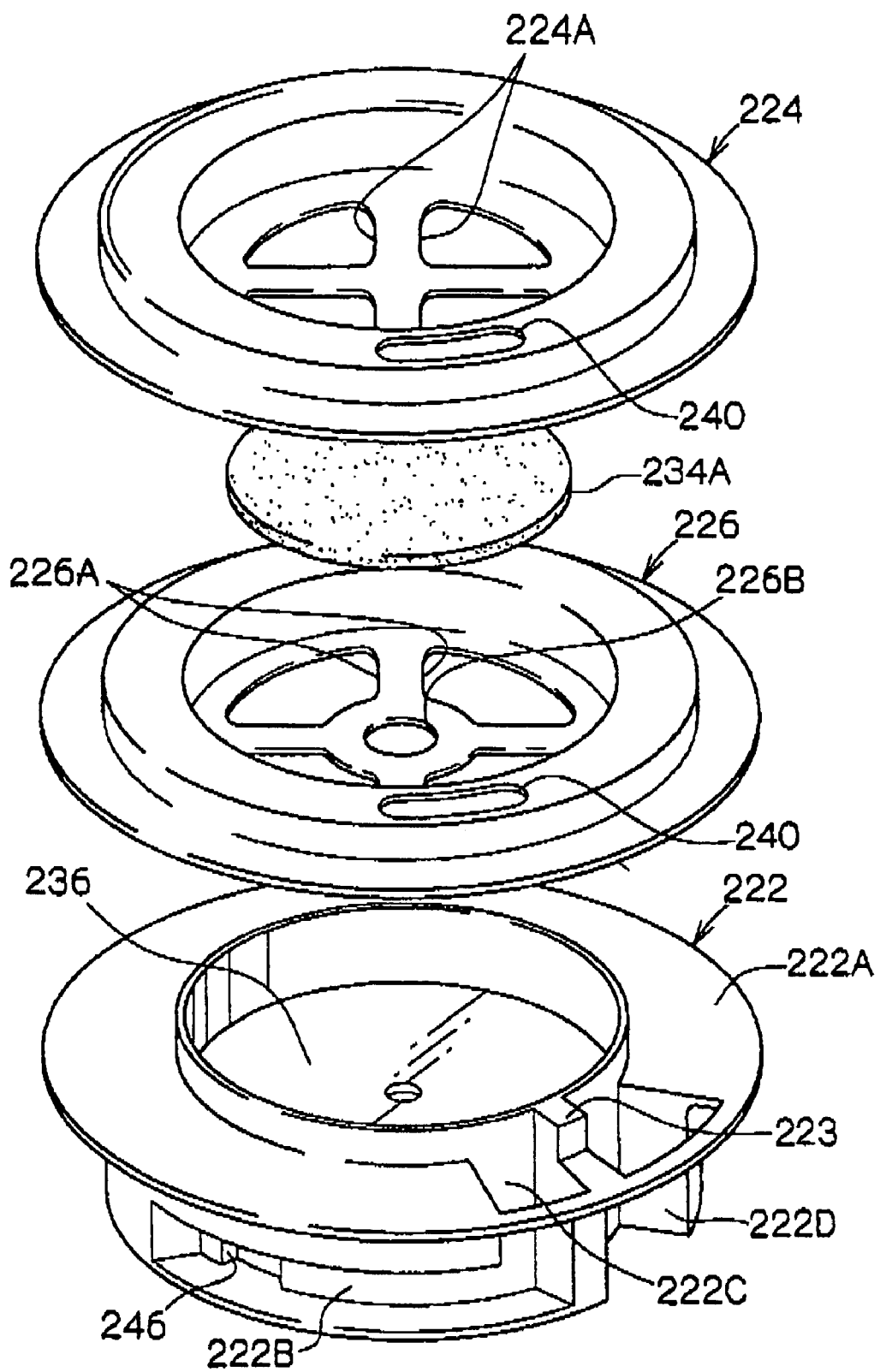
FIG. 19 is an exploded perspective side view of the upper member, the lower member, the orifice-forming member, and the like, which are used in the fourth embodiment of the vibration isolator according to the present invention.

Further, as shown in FIG. 19, in the portion of the upper member 224 that is closer to the inner periphery thereof, a plurality of through-holes 224A are provided annularly around the center of the upper member 224. In addition, in the portion of the lower member 226 that is closer to the inner periphery thereof, a plurality of through-holes 226A are provided annularly around the center of the lower member 226, and a central hole 226B is provided at the center of these plurality of through-holes 226A in the lower member 226.

Figure 20:
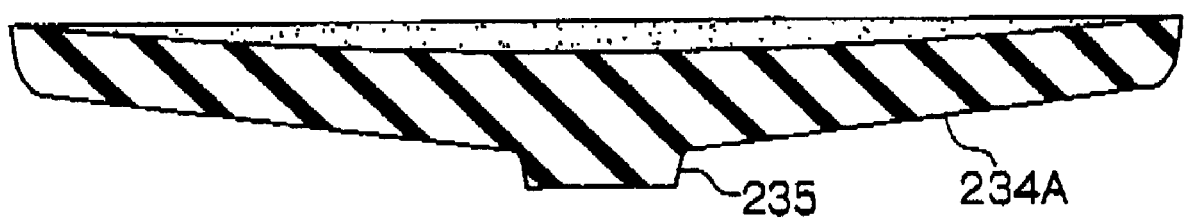
FIG. 20 is a sectional view of the valve body, in a free state, which is used in the fourth embodiment of the vibration isolator according to the present invention.

In the clearance between the portions of the upper member 224 and the lower member 226 that are closer to the inner periphery thereof, a valve body 234A is disposed which is constructed in the shape of a disk with an elastic material, such as a rubber material, a synthetic resin material, or the like. That is, in the central portion at the bottom of the valve body 234A, a protrusion portion 235 which is protruded downward is provided, and the protrusion portion 235 is fitted into a central hole 226B provided at the center of the lower member 226 to support the valve body 234A. The valve body 234A is formed in a disk-like shape in which the portion of the top that is closer to the central portion is slightly concave in a free state as shown in FIG. 20.

Although the thickness of the valve body 234A is made to be slightly smaller than the clearance between the upper member 224 and the lower member 226, an appropriate preload is applied to the valve body 234A in assembling the vibration isolator 210, and thus the valve body 234A is deformed such that the top of the valve body 234A is pressed against the surface of the upper member 224 to be substantially flat as shown in FIG. 13 and FIG. 14.

Figure 15:
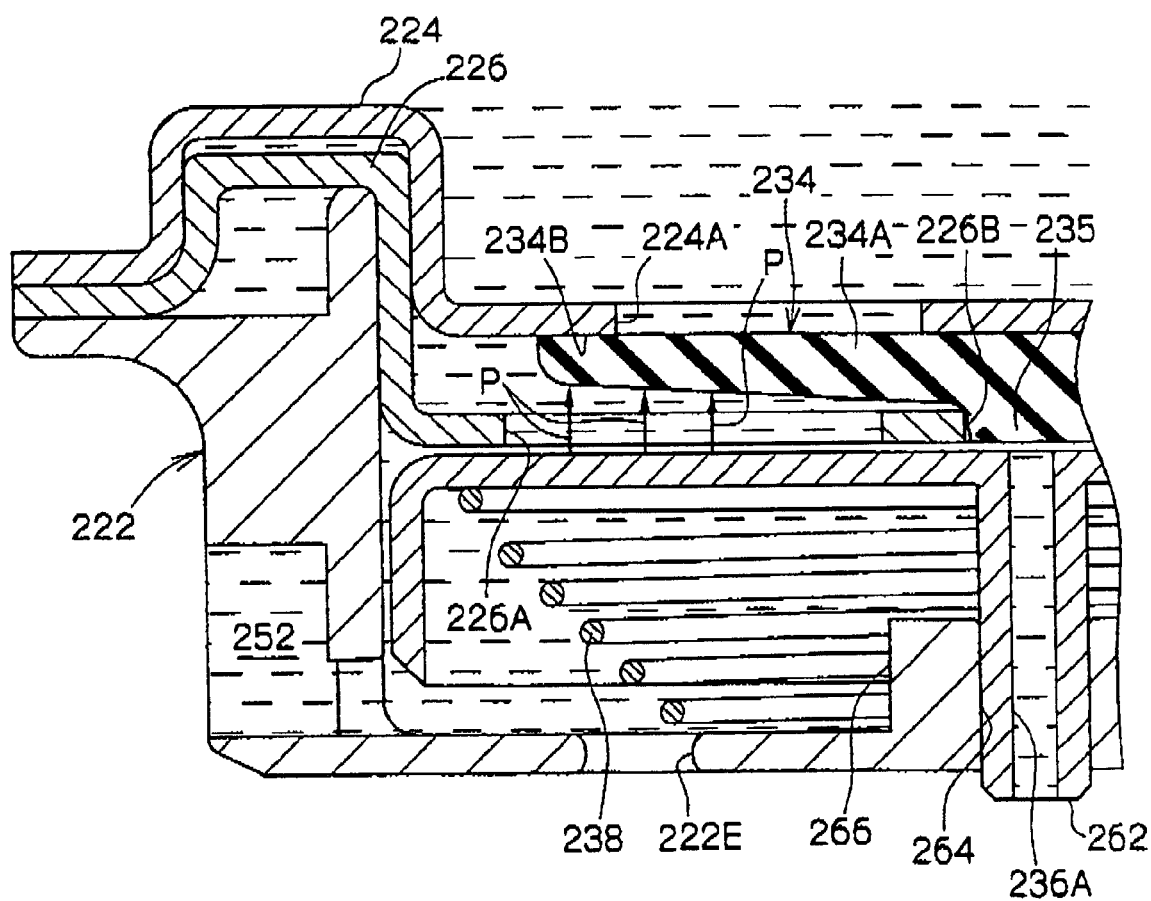
FIG. 15 is an enlarged sectional view of a main portion of FIG. 13.
Figure 16:
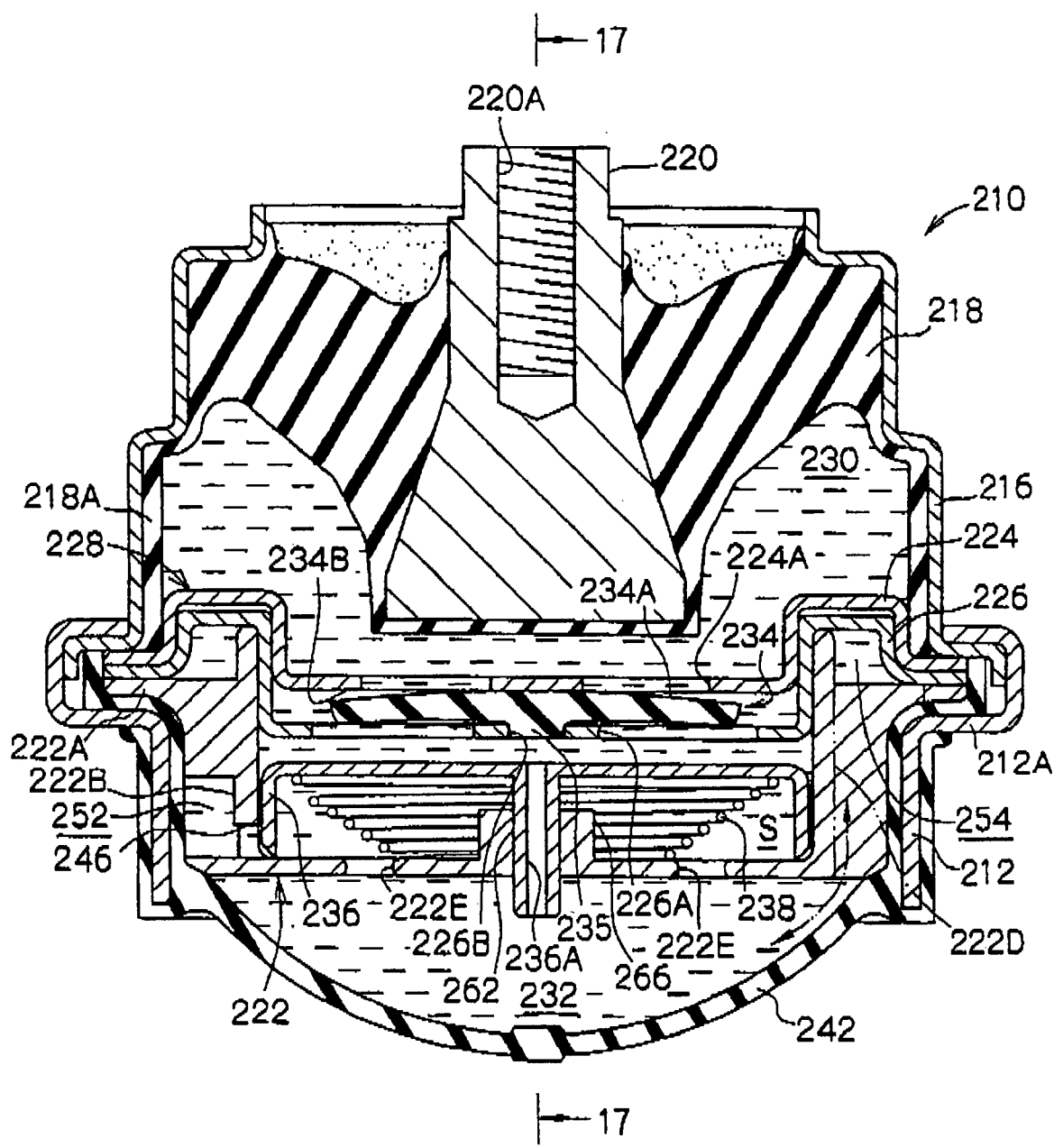
FIG. 16 is a sectional view of the fourth embodiment of the vibration isolator according to the present invention, illustrating a state of shake mode.
Figure 17:
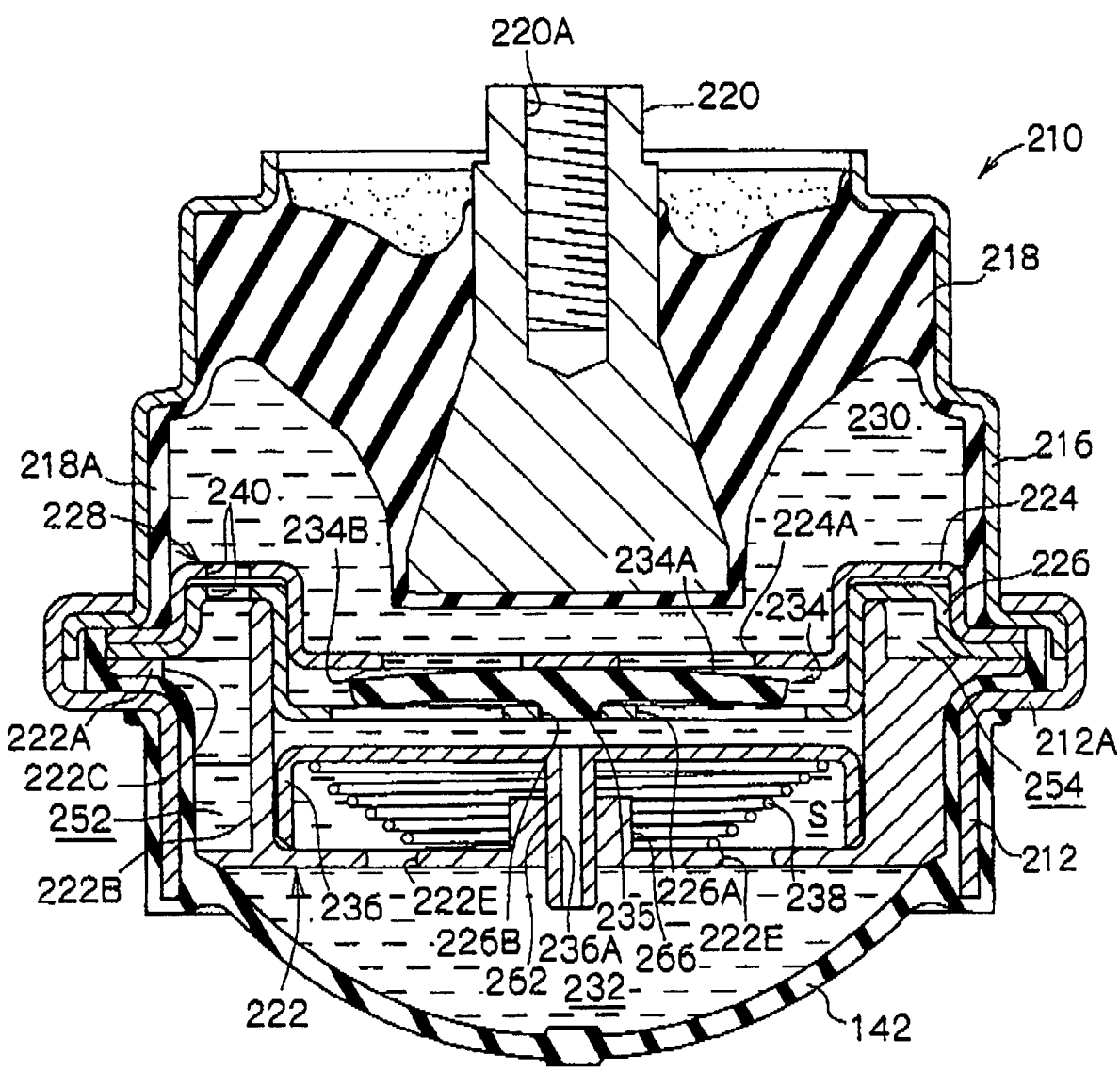
FIG. 17 is a sectional view taken on the line 17-17 in FIG. 16 as viewed in the direction of the arrows.

In addition, the outer peripheral portion of the plurality of through-holes 224A in the upper member 224 is formed so as to be more inside than the outer peripheral edge of the valve body 234A, and when the valve body 234A closes the through-holes 224A as shown in FIG. 13 to FIG. 15, the through-holes 224A are completely blocked from below by the valve body 234A. On the other hand, the outer peripheral portion of the plurality of through-holes 226A in the lower member 226 is formed so as to be more outside than the outer peripheral edge of the valve body 234A, and thus the through-holes 226A will not be completely blocked even when the valve body 234A is deformed as shown in FIG. 16 to FIG. 18.

Figure 18:
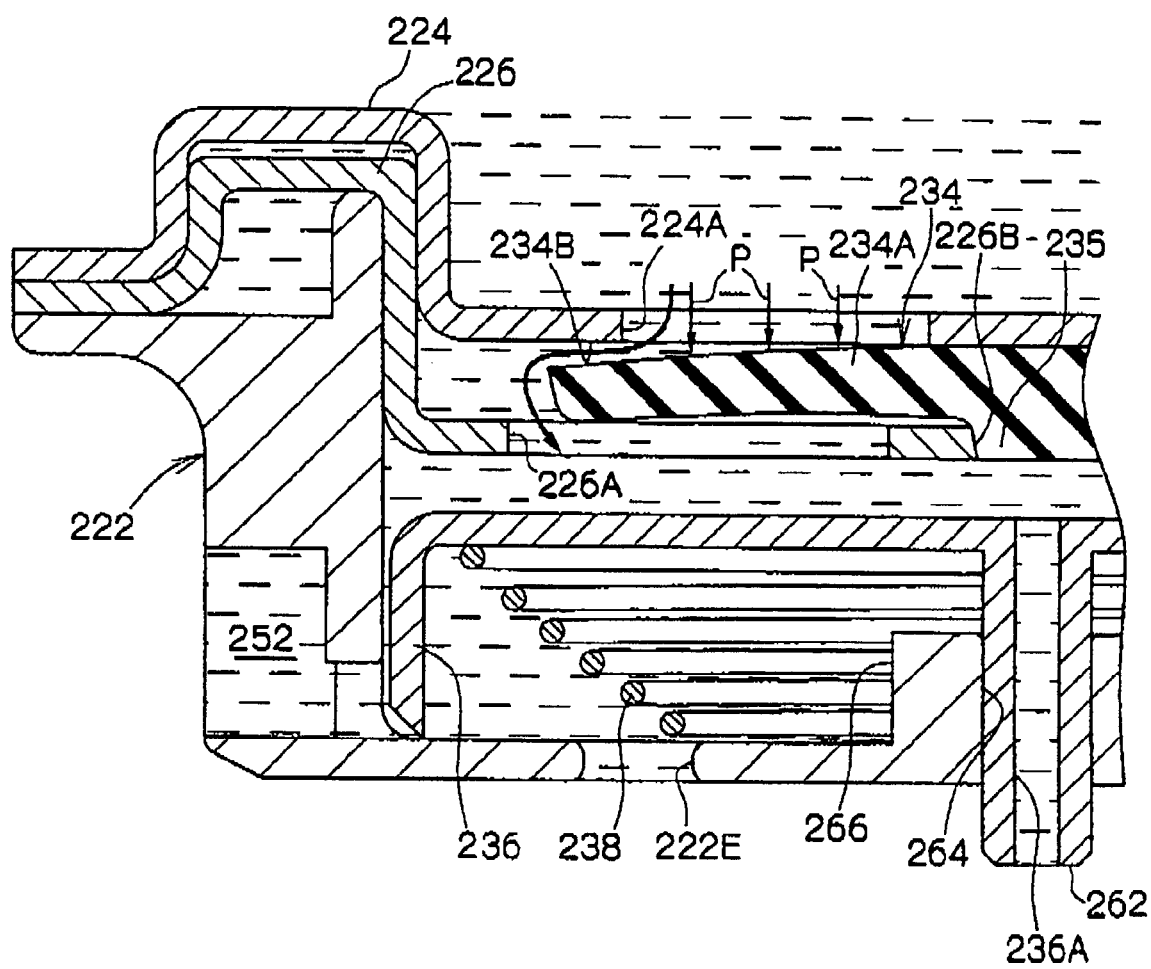
FIG. 18 is an enlarged sectional view of a main portion of FIG. 17.

Therefore, as shown in FIG. 18, when the fluid pressure P is applied from above, the portion of the valve body 234A that is closer to the outer periphery is elastically deformed downward, which results in the through-hole 224A being opened so that the fluid is permitted to flow in the directions as shown with arrows. Further, as shown in FIG. 15, when the fluid pressure P is applied from below, the outer peripheral edge of the valve body 134A is strongly abutted against the wall surface around the through-hole 224A under this fluid pressure P, resulting in the through-holes 224A being surely closed. That is, the wall surface around the through-hole 224A against which the valve body 234A is abutted provides a valve seat 234B. In this manner, a check valve 234 is structured by the valve body 234A and the valve seat 234B which permits the fluid to flow in only from the main fluid chamber 230 side and which operates more reliably and has a simple structure.

Further, as shown in FIG. 13 to FIG. 19, under the lower member 226 is disposed an orifice-forming member 222 which is formed in a cylindrical shape having a bottom surface. And, the orifice-forming member 222 is sized such that the inner wall surface thereof is fitted into the portion of the lower member 226 that is protruded upward in a ring-like shape, and the space inside the orifice-forming member 222 provides a cylinder space S.

On the other hand, inside the orifice-forming member 222 is provided a plunger 236, i.e., an opening and closing member which is formed in a cylindrical shape in which the top is closed with a metallic material or the like, for example in a manner that is slidably engaged with the inner wall surface of this orifice-forming member 222. In the central portion of this plunger 236, a downwardly extending shaft portion 262 is formed, and in this shaft portion 262 of the plunger 236, a small through-hole 236A is formed to allow the fluid to flow therethrough.

Further, a convex portion is formed in the bottom of the orifice-forming member 222 which is disposed in opposition to the shaft portion 262 of the plunger 236, and in this convex portion, a through-hole 264 (as shown in FIG. 15 and FIG. 18) into which he shaft portion 262 is slidably fitted is formed in a manner is aligned with the shaft portion 262. Thus, this convex portion provides a bearing portion 266.

That is, in the present embodiment, the shaft portion 262 formed in the central portion of the plunger 236 and the bearing portion 266 formed in the orifice-forming member 222 constitute a guide member which is disposed in correspondence to the central portion of the plunger 236 in order to guide the reciprocating motion of this plunger 236. Meanwhile, in this case, in order to further stabilize a sliding motion between the shaft portion 262 of the plunger 236 and the bearing portion 266 of the orifice-forming member 222, it is preferable that the shaft portion 262 and the bearing portion 266 be formed from base materials having different Young's moduli, respectively. More specifically, it is conceivable that, for example, a material having a higher Young's modulus such as iron or the like is used for the shaft portion 262, while, for the bearing portion 266, a material such as a synthetic resin or the like having a Young's modulus lower than that of the shaft portion 262 is used, as in the present embodiment.

Further, between the bottom of the orifice-forming member 222 and the top of the plunger 236 is disposed a coil spring 238, i.e., an elastic member made of a metal for biasing the plunger 236 upward. That is, the plunger 236 is moved upward while being biased by the coil spring 238, or is moved downward against the biasing force of the coil spring 238.

The coil spring 238 is formed in a helical shape having a larger diameter at the top and a smaller diameter at the bottom as shown in FIG. 13 and FIG. 14. Thus, even when this coil spring 238 is compressed, the wire turns of the coil spring 238 will not be contacted with one another. As a result of this, the coil spring 238 can be accommodated in a small space, and there is no possibility that the wire turns of the coil spring 238 contact one another so that the spring constant of the coil spring 238 is non-linearly increased.

Further, in the upper portion of the orifice-forming member 222, a pinch-held portion 222A is provided which is protruded toward the outer periphery side and in a flange-like shape. This pinch-held portion 222A is pinched in a crimped portion between the lower portion of the upper outer cylindrical metal fitting 216 and the upper portion of the lower outer cylindrical metal fitting 212 together with the outer peripheral portion of the partition member 228. In this manner, the lower outer cylindrical metal fitting 212, the upper outer cylindrical metal fitting 216, the orifice-forming member 222, and the partition member 228 are integrally secured to each other.

Further, a rubber material is thinly vulcanization-bonded over the inner and outer peripheral surfaces of the lower outer cylindrical metal fitting 212, and the peripheral edge portion of a diaphragm 242, i.e., an elastic membrane which is made of rubber and elastically deformable is connected to the lower portion of the rubber material which is vulcanization-bonded to the lower outer cylindrical metal fitting 212. Thus, the thin diaphragm 242 is disposed under the lower outer cylindrical metal fitting 212, and the space between this diaphragm 242 and the bottom of the orifice-forming member 222 provides a fluid sub-chamber 232. The lower portion of the diaphragm 242 is opened to the atmosphere, which facilitates deformation of the diaphragm 242.

On the other hand, between the portion of the lower member 226 that is protruded upward in a ring-like shape and the top of the orifice-forming member 222, there is provided an upper passage, i.e., a space portion in the shape of a ring is provided. In addition, in the portion which is closer to the bottom of the orifice-forming member 222, a groove portion 222B is provided which extends along the outer periphery of the orifice-forming member 222. The opening portion of this groove portion 222B is closed by the rubber material bonded to the inner peripheral surface of the lower outer cylindrical metal fitting 212, and thus a lower passage having an arcuate shape is provided.

And, a partition wall 223 is provided on the top of the orifice-forming member 222, as shown in FIG. 19, and the upper passage is partitioned by this partition wall 223. In the portions of the upper member 224 and the lower member 226 that correspond to the location on the left side, in FIG. 19, of one end of the upper passage partitioned by this partition wall 223, first opening portions 240 connecting between the main fluid chamber 230 and the above-mentioned upper passage are formed as shown in FIG. 14 and FIG. 19.

In the portion of the orifice-forming member 222 that corresponds to the one end of this upper passage, a first communicating hole 222C connecting between that portion and the groove portion 222B is provided as shown in FIG. 14 and FIG. 19, and in addition, a through portion 246 is formed in the orifice-forming member 222 such that it penetrates through the bottom of this groove portion 222B toward the inner periphery side of the orifice-forming member 222.

As a result of this, through this lower passage, the through portion 246, and the like, the above-mentioned upper passage and the cylinder space S, i.e., the space inside the orifice-forming member 222 are connected to each other. Further, in the portions of the orifice-forming member 222 that correspond to the bottom outer peripheral portions of the coil spring 238, second opening portions 222E are formed which connect between the cylinder space S and the fluid sub-chamber 232.

Thus, an idle orifice 252 is provided by the space which connects to the main fluid chamber 230 through a first opening portion 240, which connects to fluid sub-chamber 232 through the second opening portion 222E, and which communicates between the opening portions through the first communicating hole 222C penetrating the orifice-forming member 222, the through portion 246, and the groove portion 222. The idle orifice 252 provides a limiting passage for absorbing idle vibration.

On the other hand, as shown in FIG. 16 and FIG. 19, in the portion of the orifice-forming member 222 that corresponds to the other end of the upper passage partitioned by the partition wall 223, there is provided a second communicating hole 222D which connects between that portion and the fluid sub-chamber 232. Thus, a shake orifice 254 is provided by the passage which is formed such that it connects to the main fluid chamber 230 through the first opening portion 240, and after rounding the upper passage, connects to the fluid sub-chamber 232 through the second communicating hole 222D. The shake orifice 254 provides a limiting passage for absorbing shake vibration.

As mentioned above, in the vibration isolator 210 according to the present embodiment, the main fluid chamber 230 and the fluid sub-chamber 232 communicate with each other through the idle orifice 252 and the shake orifice 254. However, when the plunger 236 which is slidably fitted in the cylinder space S is lowered, the idle orifice 252 is closed with the through portion 246 being blocked.

Thus, as shown in FIG. 13 to FIG. 15, the plunger 236 is moved between the position where the plunger 236 is raised to open the idle orifice 252 and the position where the plunger 236 is lowered to close the idle orifice 252, the position of the plunger 236 so that the position of the plunger 236 is changed over, thus resulting in the idle orifice 252 being opened or closed.

Next, the function of the vibration isolator 210 according to the present embodiment will be described.

When the engine mounted on the top metal fitting 220 is operated, vibration of the engine is transmitted to the elastic element 218 through the top metal fitting 220. The elastic element 218 functions as a vibration absorbing body which absorbs the vibration by virtue of its vibration damping capacity based on the internal friction of the elastic element 218, thereby making it difficult for the vibration to be transmitted to the vehicle body.

Further, the internal volume of the main fluid chamber 230 a portion of the partition wall of which is formed by the elastic element 218 is changed in compliance with deformation of the elastic element 218, so that the pressure of the fluid in the two orifices 252, 254 which communicate between this main fluid chamber 230 and the fluid sub-chamber 232 is changed. Thus, due to deformation of the diaphragm 242 which deformably forms a portion of the partition wall of the fluid sub-chamber 232, the fluid sub-chamber 232 is expanded or contracted, and thus the fluid in the orifices 252, 254 between the main fluid chamber 230 and this fluid sub-chamber 232 is caused to flow.

On the other hand, at least the idle orifice 252 of these two orifices 252, 254 is not only formed by the partition member 228 and the orifice-forming member 222 which are disposed such that they partition between the main fluid chamber 230 and the fluid sub-chamber 232, but also the plunger 236 is reciprocatably disposed in the cylinder space S including a portion of this idle orifice 252. Further, the check valve 234 which is disposed between the main fluid chamber 230 and this plunger 236 causes the fluid to flow from the main fluid chamber 230 side only to the plunger 236, and in addition, the coil spring 238 causes the plunger 236 to be biased toward the check valve 234.

Thus, due to deformation of the elastic element 218 which results from the vibration being applied to the vibration isolator 210, the main fluid chamber 230 which is filled with the fluid is expanded or contracted so that the internal volume thereof is changed. Further, due to a fluid pressure fluctuation caused by the change in the internal volume of the main fluid chamber 230, the plunger 236 is reciprocated in the vertical direction in the cylinder space S so as to open and close the trough portion 246, thus resulting in the idle orifice 252 being opened and closed.

In this case, in the present embodiment, the shaft portion 262 formed in the central portion of the plunger 236 and the bearing portion 266 formed in the orifice-forming member 222 constitute a guide member which is disposed in correspondence to the central portion of the plunger 236, and thus the reciprocating motion of the plunger 236 is guided by the shaft portion 262 and the bearing portion 266.

As a result of this, when vibration from the engine side is transmitted, the vibration is damped due to not only the elastic deformation of the elastic element 218, but also the damping action based on the viscous drag, the fluid column resonance and the like of the fluid in the orifices 252, 254 connecting between the main fluid chamber 230 and the fluid sub-chamber 232, thereby making it difficult for the vibration to be transmitted to the vehicle body. Further, as a result of having the idle orifice 252 which is opened and closed by the vertical motion of the plunger 236, in addition to the shake orifice 254 which is normally opened, the following functions are provided.

Hereinbelow, the operation of the vibration isolator 210 according to the present embodiment will be described specifically.

For example, when an idle vibration is applied to the vibration isolator 210, since the pre-compression load on the coil spring 238 for biasing the plunger 236 toward the check valve 234 is higher than the force generated due to a fluid pressure fluctuation in the main fluid chamber 230, the check valve 234 is brought into a closed state, as shown in FIG. 13 and FIG. 14. Therewith, the plunger 236 is pushed upward by the coil spring 238, and is at standstill in the upward position in the cylinder space S.

And, with the plunger 236 being at standstill in the upward position in the cylinder space S and the through portion 246 being opened, the fluid having passed through the through portion 246 and the second opening portion 222E is permitted to flow in this cylinder space S, and an open state occurs in which the idle orifice 252 is opened. Thus, the main fluid chamber 230 and the fluid sub-chamber 232 communicate with each other through the idle orifice 252, and the fluid is permitted to flow into or out of the idle orifice 252. As a result of this, the fluid produces a fluid column resonance or the like in the idle orifice 252, so that the dynamic spring constant for the vibration isolator 210 is reduced and the idle vibration is absorbed.

On the other hand, when a shake vibration is applied to the vibration isolator 210, the force generated due to the fluid pressure fluctuation in the main fluid chamber 230 is increased and exceeds the pre-compression load on the coil spring 238, so that the outer peripheral side of the valve body 234A is elastically deformed and the fluid flows in from the main fluid chamber 230. Further, under the pressure of this fluid, the plunger 236 is moved downward, i.e., toward the coil spring 238 against the biasing force of the coil spring 238 as shown in FIG. 16 and FIG. 17, until it abuts against the bottom of the orifice-forming member 222 and is at standstill.

Thus, the through portion 246 is blocked by the outer peripheral portion of the plunger 236, and a closed state of the idle orifice 252 occurs in which a portion of the idle orifice 252 is reliably shut off, and the main fluid chamber 230 and the fluid sub-chamber 232 communicate with each other only through the shake orifice 254. As a result of this, the fluid positively flows forward and backward inside the shake orifice 254 and is subjected to a passing resistance, or a fluid column resonance is produced, so that the shake vibration is absorbed.

Thereafter, when the amplitude of the vibration inputted to the vibration isolator 210 decreases again, the valve body 234A is closed, and the fluid flows through the through-hole 236A extending through the plunger 236 and through the clearance between the inner peripheral surface of the orifice-forming member 222 and the plunger 236, and the plunger 236 is again returned to the upward position in the cylinder space S as shown in FIG. 13 and FIG. 14.

Further, in the present embodiment, the shaft portion 262 and the bearing portion 266, i.e., the guide member which is disposed in correspondence to the central portion of the plunger 236 guides the above-mentioned reciprocating motion of the plunger 236, and thus there is no possibility that the plunger 236 is inclined obliquely. And therewith, there is no possibility that the plunger 236 is stopped without making a full reciprocating motion, so that the plunger 236 surely makes a reciprocating motion and the idle orifice 252 is stably opened and closed.

On the other hand, in the present embodiment, as shown in FIG. 20, the valve body 234A is formed of an elastic material wherein a surface thereof disposed in opposition to the main fluid chamber 230 is made concave. The valve body 234A is disposed between the upper member 224 and the lower member 226 in a state in which a preload is applied toward the main fluid chamber 230 such that the surface of the valve body 234A which is disposed in opposition to the main fluid chamber 230 is pressed against the valve seat 234B.

In other words, the check valve 234 of the present embodiment has a simple structure which simply utilizes the elasticity of the valve body 234 formed of an elastic material, and thus the check valve 234 is not only capable of being surely opened or closed as required, but also the durability of the check valve 234 and the mass productivity of the vibration isolator 210 is increased. Therewith, in the present embodiment, a rubber material or a synthetic resin material is used as the elastic material constituting the valve body 234A so that the valve body 234A which reliably undergoes elastic deformation can be obtained at low cost.

As will be understood from the above description, the vibration isolator 210 according to the present embodiment has a structure in which there are provided the idle orifice 252 which is opened and closed by the plunger 236, and the shake orifice 254 which is capable of reducing a vibration having a high amplitude and a low frequency which cannot be reduced by the idle orifice 252.

For this reason, the two orifices 252, 254 can be changed over without using any actuator, solenoid valve, controller or the like, and the manufacturing cost of the vibration isolator 210 can be reduced while the vibration isolating performance is maintained over a wide range of amplitude and frequency. Further, in the present embodiment, the existence of the shaft portion 262 and the bearing portion 266 also enables the idle orifice 252 to be stably opened and closed.

Next, a fifth embodiment of the vibration isolator according to the present invention will be illustrated in FIG. 21, and with reference to this figure, the present embodiment will be described. Meanwhile, the elements which have been described in the fourth embodiment will be indicated by the same reference numerals, and a further description thereof will be omitted.

Figure 21:
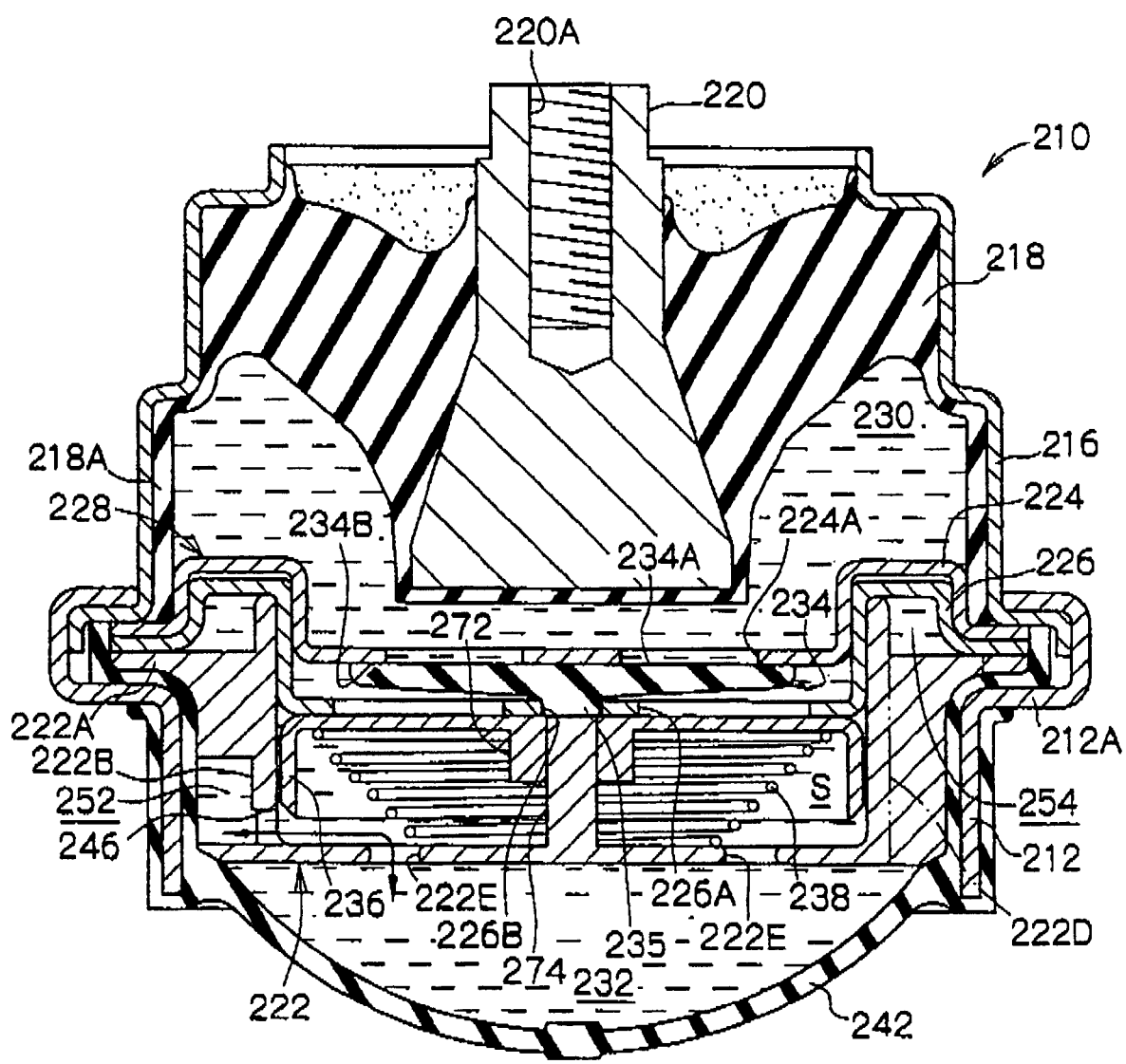
FIG. 21 is a sectional view of a fifth embodiment of the vibration isolator according to the present invention, illustrating a state of idle mode.

As shown in FIG. 21, the present embodiment also has substantially the same structure as the fourth embodiment, except that in the present embodiment, a bearing portion 272 is formed in the central portion of the plunger 236, and in the orifice-forming member 222, a shaft portion 274 is formed. And, the bearing portion 272 of the plunger 236 and the shaft portion 274 of the orifice-forming member 222 constitute a guide member.

Therefore, in the present embodiment, the bearing portion 272 formed in the central portion of the plunger 236, and the shaft portion 274 formed in the orifice-forming member 222 constitute the guide member, thus the plunger 236 makes a reciprocating motion, while being specifically guided by the shaft portion 274 and the bearing portion 272, so that stable opening and closing of the idle orifice 252 can be assured also in the present embodiment as in the fourth embodiment.

Next, a sixth embodiment of the vibration isolator according to the present invention will be illustrated in FIG. 22, and with reference to this figure, the present embodiment will be described. Meanwhile, the components which have been described in the fourth embodiment will be indicated by the same reference numerals, and a further description will be omitted.

As shown in FIG. 22, the present embodiment also has substantially the same structure as the fourth embodiment, and also in the present embodiment, the check valve 234 is contained in the partition member 228 which is provided between the main fluid chamber 230 and the fluid sub-chamber 232 for partitioning between the main fluid chamber 230 and the fluid sub-chamber 232, except that in the present embodiment, the shaft portion 276 is formed in the central portion of the plunger 236, and the bearing portion 278 is formed in the lower member 226 of the partition member 228. And, the bearing portion 278 of the partition member 228 and the shaft portion 276 of the plunger 236 constitute a guide member.

Therefore, in the present embodiment, the shaft portion 276 formed in the central portion of the plunger 236 and the bearing portion 278 formed in the partition member 228 containing the check valve 234 constitute the guide member, and thus the plunger 236 makes a reciprocating motion while being specifically guided by the shaft portion 276 and the bearing portion 278, so that the stable opening and closing of the idle orifice 252 is more reliably assured also in the present embodiment as in the fourth embodiment. Meanwhile, in the present embodiment, the shaft portion 276 includes no through-hole 236A that is provided in the fourth embodiment, but instead thereof, a hole portion 280 which has the same function as the through-hole 236A is formed in the plunger 236.

Next, a seventh embodiment of the vibration isolator according to the present invention will be illustrated in FIG. 23, and with reference to this figure, the present embodiment will be described. Meanwhile, the components which have been described in the fourth embodiment will be indicated by the same reference numerals, and a further description thereof will be omitted.

Figure 23:
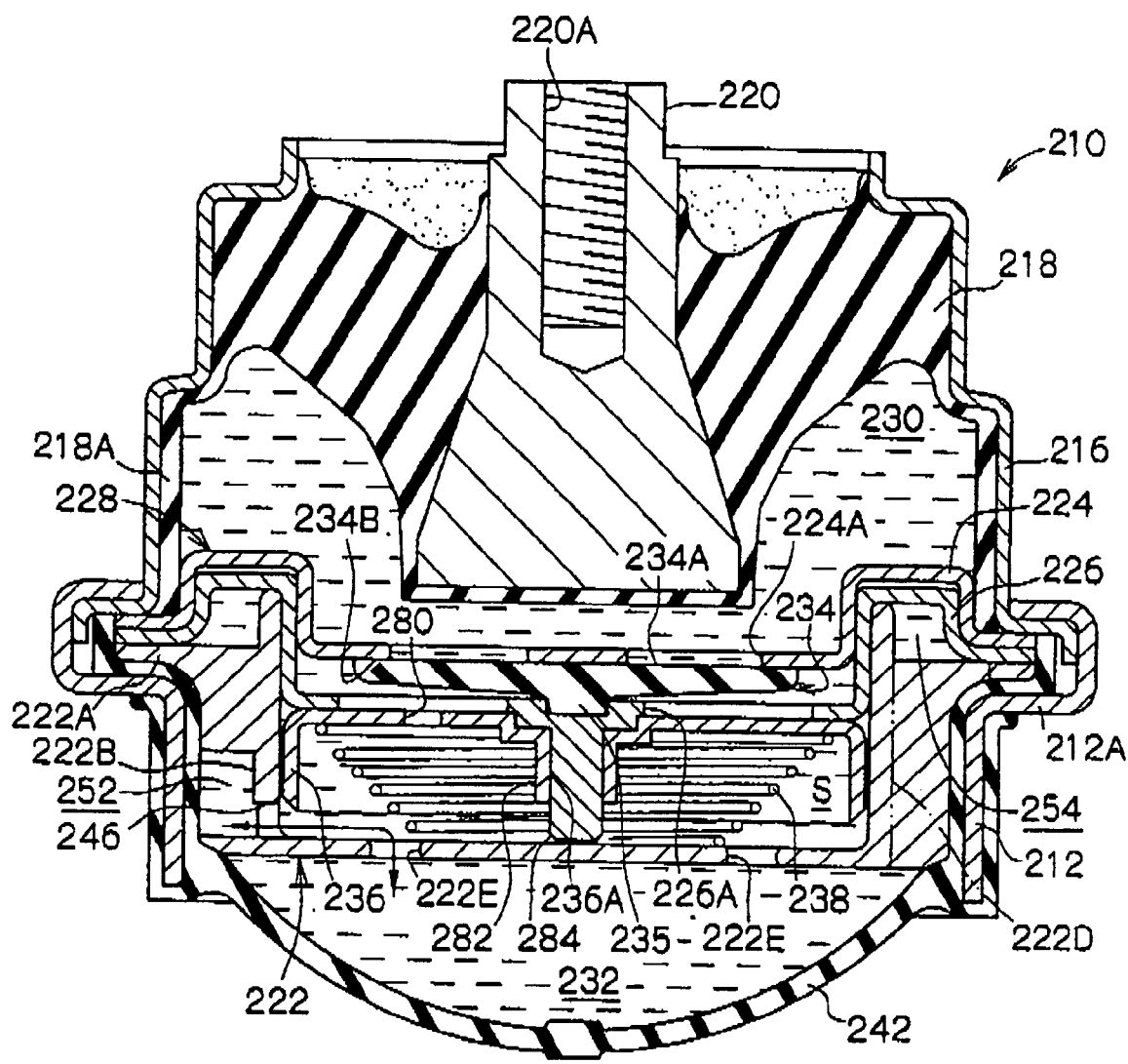
FIG. 23 is a sectional view of a seventh embodiment of the vibration isolator according to the present invention, illustrating a state of idle mode.

As shown in FIG. 23, the present embodiment also has substantially the same structure as the seventh embodiment, except that in the present embodiment, the bearing portion 282 is formed in the central portion of the plunger 236, and in the lower member 226 of the partition member 228, the shaft portion 284 is formed. And, the bearing portion 282 of the plunger 236 and the shaft portion 284 of the partition member 228 constitute a guide member. In addition, a hole portion 280 is formed in the plunger 236 as in the sixth embodiment.

Therefore, in the present embodiment, the bearing portion 282 formed in the central portion of the plunger 236 and the shaft portion 284 formed in the partition member 228 containing the check valve 234 constitute the guide member. Thus the plunger 236 makes a reciprocating motion while being specifically guided by the shaft portion 284 and the bearing portion 282, so that the stable opening and closing of the idle orifice 252 is more reliably assured also in the present embodiment as in the fourth embodiment.

In the above-mentioned embodiment, the top metal fitting 220 is connected to the engine, which is the vibration generation portion, and the lower outer cylindrical metal fitting 212 is connected to the vehicle body, which is the vibration reception portion, however, a reverse configuration may be used.

Further, the shape of the bearing portion in the above-mentioned embodiment may be any of hole-like and cylindrical shapes, and in fabricating the shaft portion and the bearing portion, such portions may be fabricated by means of cutting or welding.

On the other hand, although in the above-mentioned embodiments, the object has been directed to vibration isolation for motor vehicle engines, and the like, it goes without saying that the vibration isolator of the present invention can be used for other applications, and the configurations and the like are not limited to those as given in the embodiments, the present invention being applicable to the vibration isolator having any other type of structure.

Next, eighth to eleventh embodiments of the vibration isolator according to the present invention will be illustrated in FIG. 24 to FIG. 27. Meanwhile, these eighth to eleventh embodiments are based on the third embodiment of the vibration isolator according to the present invention (refer to FIG. 10 to FIG. 12), wherein the guide member as described in the fourth to seventh embodiments is applied to this third embodiment of the vibration isolator 110. Therefore, in the eighth to eleventh embodiments, the components which have been described in the third to seventh embodiments will be given the same reference numerals, and a further description there of will be omitted.

Figure 24:
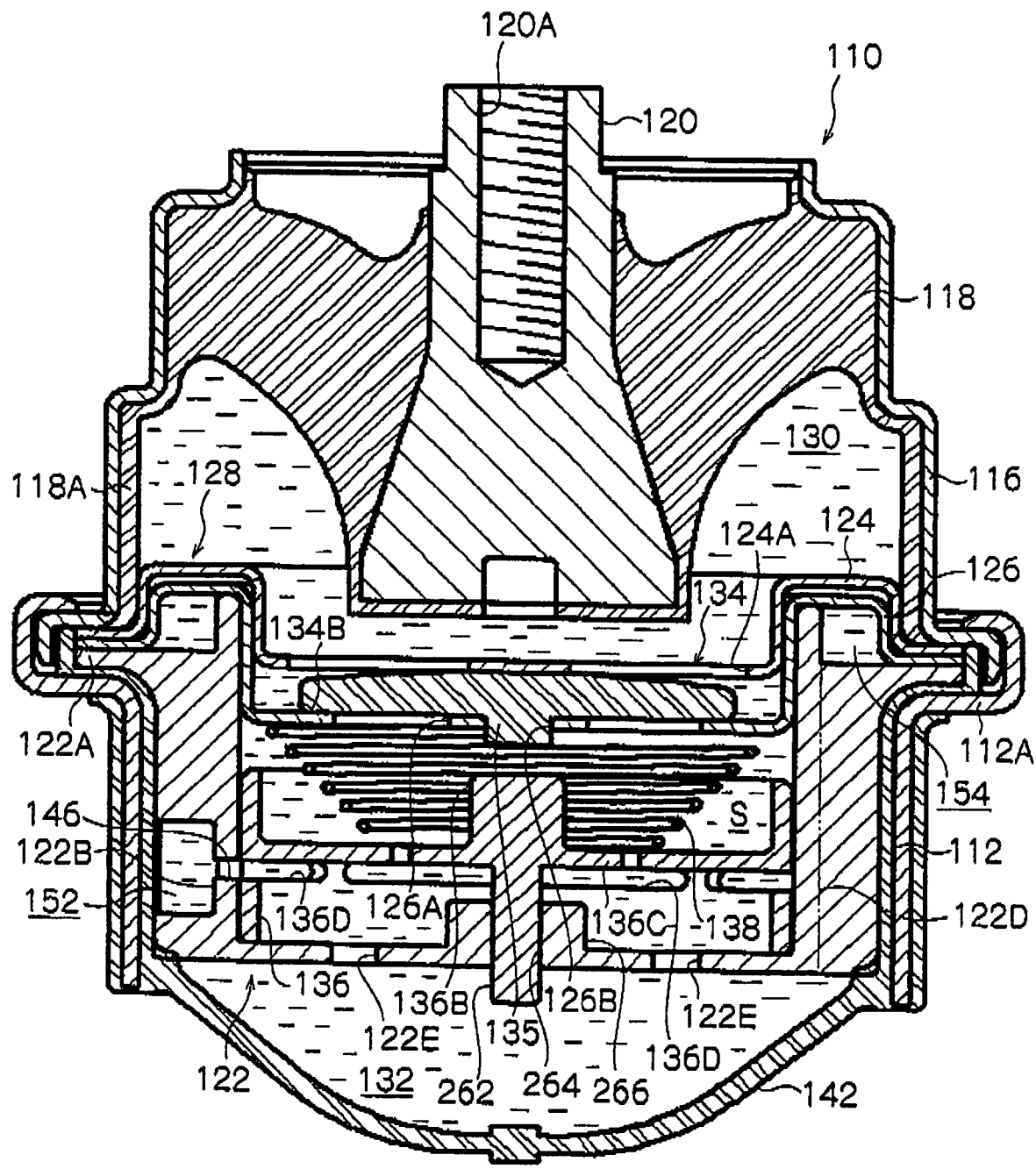
FIG. 24 is a sectional view of an eighth embodiment of the vibration isolator according to the present invention, illustrating a state of idle mode.

As shown in FIG. 24, in the eighth embodiment of the vibration isolator according to the present invention, a shaft portion 262 extending downward is formed in the central portion of the plunger 136. On the other hand, in the bottom of the orifice-forming member 122 which is disposed in opposition to the shaft portion 262 of this plunger 236, a convex portion is formed, and in this convex portion is formed a through-hole 264 which is slidably engaged with this shaft portion 262 while being aligned with the shaft portion 262, and thus the convex portion provides a bearing portion 266. In other words, in the present embodiment, the shaft portion 262 formed on the central portion of the plunger 136 and the bearing portion 266 formed on the orifice-forming member 122 constitute a guide member which is disposed in correspondence to the central portion of the plunger 236 in order to guide the reciprocating motion of this plunger 236.

The vibration isolator 110 according to the present embodiment configured as described above performs the functional effects which are basically common to those of the vibration isolator 110 according to the third embodiment. In addition to this, in the vibration isolator 110 according to the present embodiment, the shaft portion 262 formed in the central portion of the plunger 136 and the bearing portion 266 formed in the orifice-forming member 222 constitute a guide member which is disposed in correspondence to the central portion of the plunger 136, and thus the shaft portion 262 and the bearing portion 266 guide the reciprocating motion of the plunger 236.

As a result of this, in the present embodiment, the shaft portion 262 and the bearing portion 266, i.e., the guide member which is disposed in correspondence to the central portion of the plunger 136 guides the reciprocating motion of the plunger 136 as described above, and thus there is no possibility that the plunger 136 is inclined obliquely. And therewith, there is no possibility that the plunger 136 is stopped without making a full reciprocating motion, and thus the plunger 136 reliably makes a reciprocating motion so that the idle orifice 152 is stably opened and closed.

Figure 25:
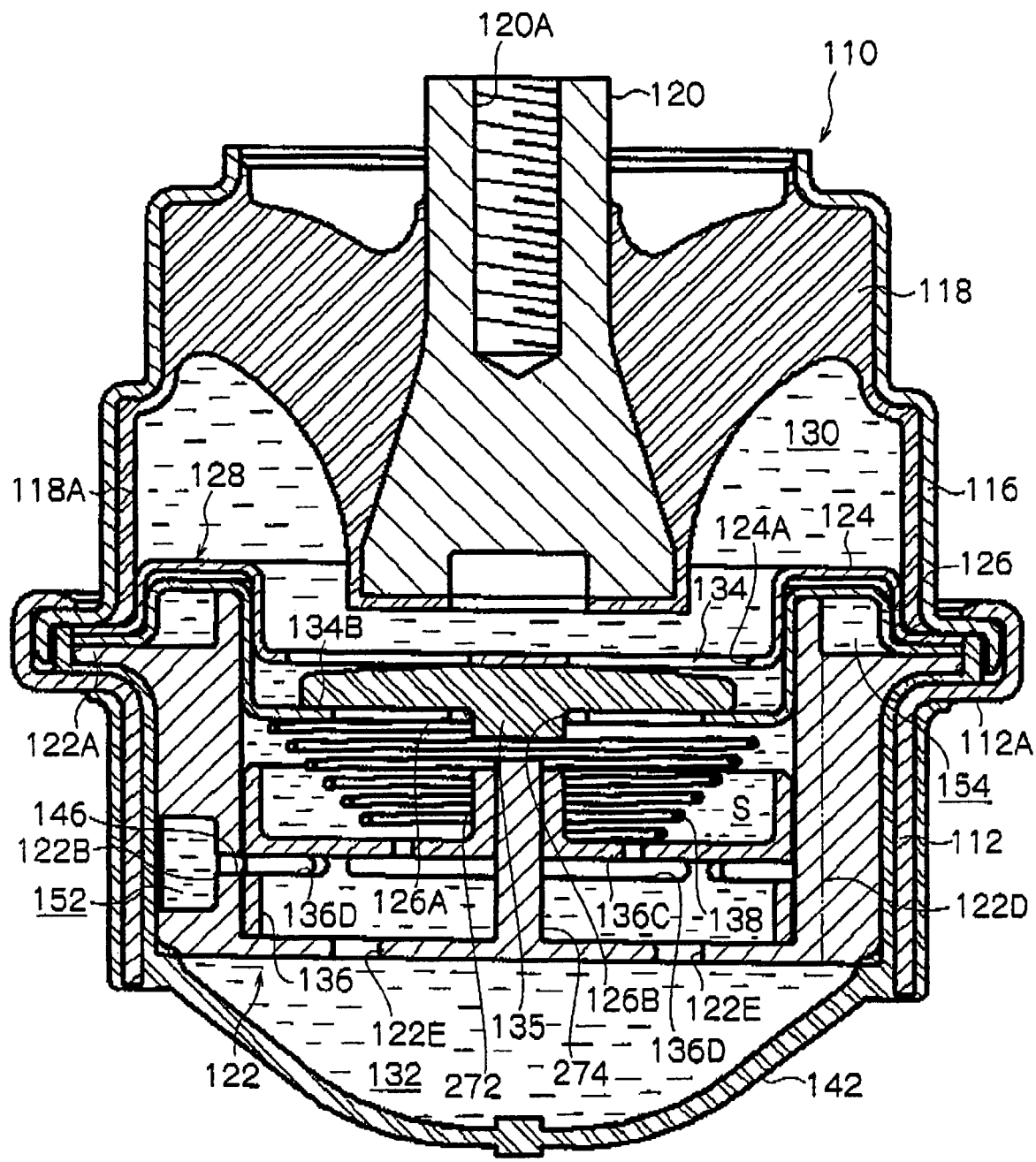
FIG. 25 is a sectional view of a ninth embodiment of the vibration isolator according to the present invention, illustrating a state of idle mode.

As shown in FIG. 25, the ninth embodiment of the vibration isolator according to the present invention also has substantially the same structure as that of the eighth embodiment, except that in the present embodiment, a bearing portion 272 is formed in the central portion of the plunger 136, and in the orifice-forming member 122, a shaft portion 274 is formed. And, the bearing portion 272 of the plunger 136 and the shaft portion 274 of the orifice-forming member 122 constitute a guide member.

Thus, in the present embodiment, the bearing portion 272 formed in the central portion of the plunger 136 and the shaft portion 274 formed in the orifice-forming member 122 constitute the guide member, so that the plunger 236 makes a reciprocating motion while being specifically guided by the shaft portion 274 and the bearing portion 272, and the stable opening and closing of the idle orifice 152 is more reliably assured also in the present embodiment as in the eighth embodiment.

As shown in FIG. 25, the vibration isolator of the ninth embodiment according to the present invention also has substantially the same structure as that of the eighth embodiment, and also in the present embodiment, the check valve 134 is contained in the partition member 128 which is provided between the main fluid chamber 130 and the fluid sub-chamber 132 for partitioning between the main fluid chamber 130 and the fluid sub-chamber 132, except that in the present embodiment, a shaft portion 276 is formed in the central portion of the plunger 136, and a bearing portion 278 is formed in the lower member 126 of the partition member 128. And, the bearing portion 278 of the partition member 128 and the shaft portion 276 of the plunger 136 constitute a guide member. Thus, in the present embodiment, the shaft portion 276 formed in the central portion of the plunger 136 and the bearing portion 278 formed in the partition member 128 containing the check valve 134 constitute the guide member, and thus the plunger 136 makes a reciprocating motion while being specifically guided by the shaft portion 276 and the bearing portion 278, so that the stable opening and closing of the idle orifice 152 is more reliably assured also in the present embodiment as in the eighth embodiment.

Figure 26:
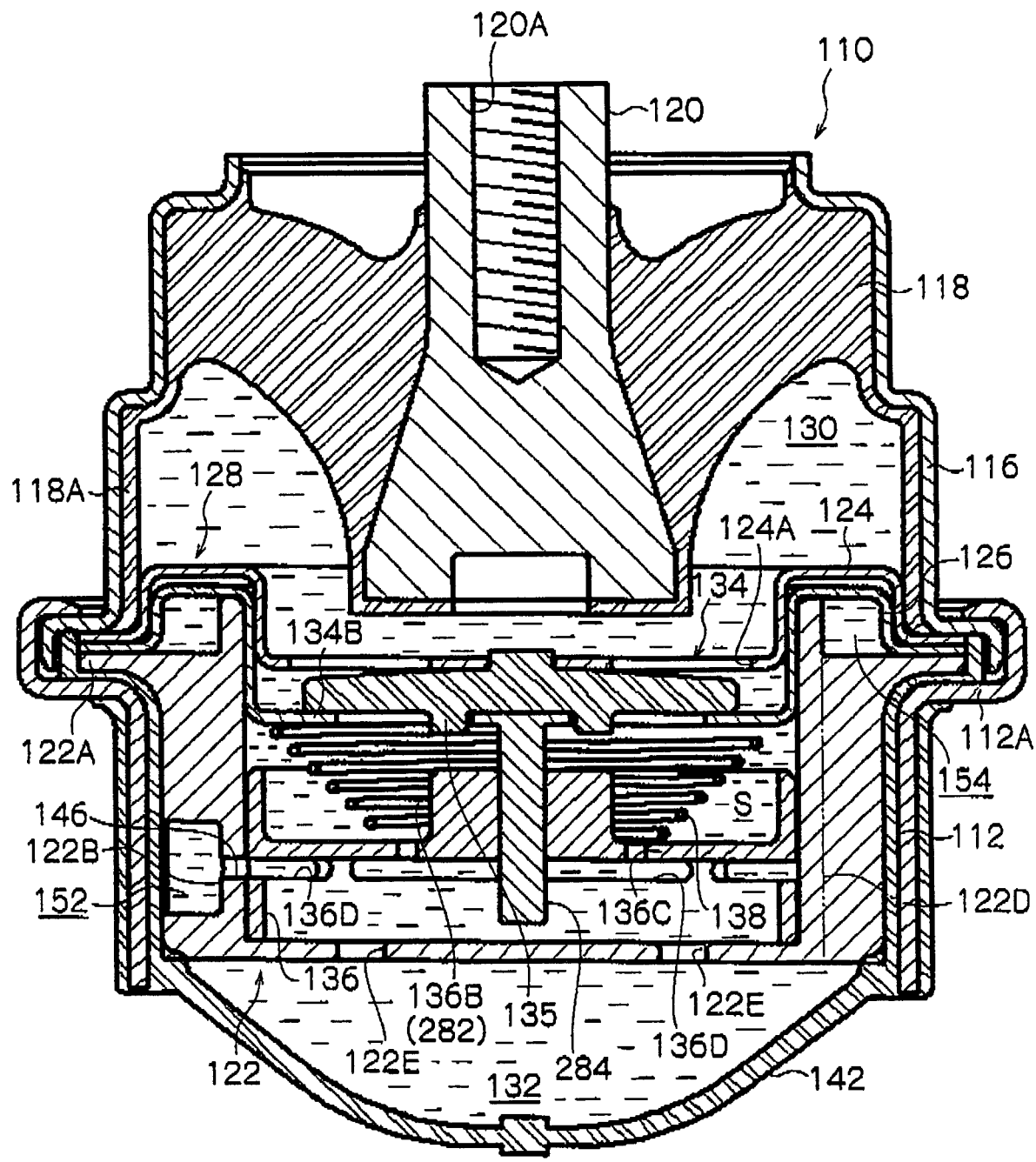
FIG. 26 is a sectional view of a tenth embodiment of the vibration isolator according to the present invention, illustrating a state of idle mode.

As shown in FIG. 26, the vibration isolator of the tenth embodiment according to the present invention also has substantially the same structure as that of the eighth embodiment, however, in the present embodiment, a abutting portion 136B is formed in the central portion of the plunger 136, and in the central portion of this abutting portion 136B, a bearing portion 282 is formed by forming a hole portion which penetrates in the axial direction. In addition, a structure in which a shaft portion 284 is formed in the lower member 126 of the partition member 128 is provided. And, the bearing portion 282 of the plunger 136 and the shaft portion 284 of the partition member 128 constitute the guide member.

Thus, in the present embodiment, the bearing portion 282 formed in the central portion of the plunger 136, and the shaft portion 284 formed in the partition member 128 containing the check valve 134 constitute the guide member, and thus the plunger 136 makes a reciprocating motion while being specifically guided by the shaft portion 284 and the bearing portion 282, so that the stable opening and closing of the idle orifice 152 is more reliably provided also in the present embodiment as in the eighth embodiment.

Figure 27:
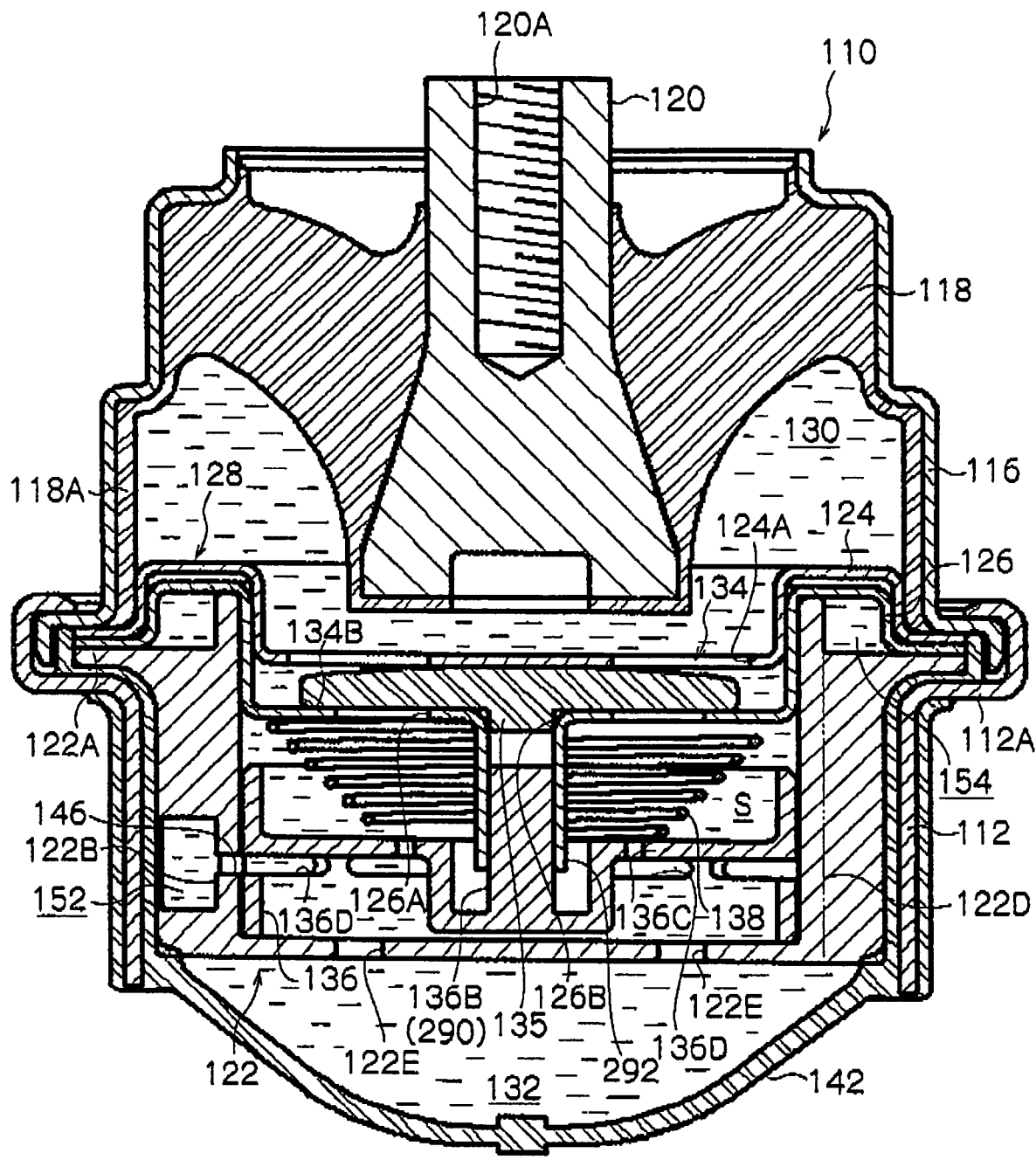
FIG. 27 is a sectional view of an eleventh embodiment of the vibration isolator according to the present invention, illustrating a state of idle mode.

As shown in FIG. 27, the vibration isolator of the eleventh embodiment according to the present invention also has substantially the same structure as that of the eighth embodiment, except that in the present embodiment the abutting portion 136B formed on the central portion of the plunger 136 has also the function as a shaft portion 290. In addition, a bearing portion 292 in the form of a cylinder is formed in the lower member 126 of the partition member 128. And, the shaft portion 290 of the plunger 136 and the bearing portion 292 of the partition member 128 constitute a guide member.

Therefore, in the present embodiment, the shaft portion 290 formed on the central portion of the plunger 136, and the bearing portion 292 formed on the partition member 128 containing the check valve 134 constitute the guide member, and thus the plunger 136 makes a reciprocating motion while being specifically guided by the shaft portion 290 and the bearing portion 292, so that the stable opening and closing of the idle orifice 152 is more reliably assured also in the present embodiment as in the eighth embodiment.

Meanwhile, although in the above-mentioned embodiments, the top metal fitting 120 is connected to the engine, which is the vibration generation portion, and the lower outer cylindrical metal fitting 112 is connected to the vehicle body, which is the vibration reception portion, it is possible that a reverse configuration may be used. In addition, although in the above-mentioned eighth to eleventh embodiments, the object has been directed to vibration isolation for motor vehicle engines or the like, it goes without saying that the vibration isolator of the present invention can be used for other applications, and the configurations and the like are not limited to those as given in the embodiments, the present invention being applicable to the vibration isolator having any other type of structure.

EFFECT OF THE INVENTION

As described above, the vibration isolator of the present invention is structured as described above, and provides an excellent effect that the manufacturing cost can be reduced.

The invention claimed is:

1. A vibration isolator, comprising:
a first mounting member which is connected to one of a vibration generation portion and a vibration reception portion;
a second mounting member which is connected to the other of the vibration generation portion and the vibration reception portion;
an elastic element which is disposed between the first and second mounting members and can be elastically deformed;
a main fluid chamber which has the elastic element as a portion of a partition wall and is filled with a fluid, and whose internal volume is changed due to deformation of the elastic element;
a fluid sub-chamber which is filled with the fluid and in which at least a portion of a partition wall is deformably formed;
an orifice which communicates between the main fluid chamber and the fluid sub-chamber;
an opening and closing member which is disposed in a space including a portion of the orifice and causes the orifice to be opened and closed due to a reciprocating motion thereof;
a check valve which is disposed between the main fluid chamber and the opening and closing member, and allows the fluid to flow from the main fluid chamber only toward the opening and closing member; and
an elastic member which biases the opening and closing member toward the check valve;
wherein
the check valve is comprises of a valve body and a valve seat;
the valve body is made of an elastic material, a surface disposed in opposition to the main fluid chamber being made concave; and
the valve body is disposed under a preload applied toward the main fluid chamber side such that the surface of the valve body which is disposed in opposition to the main fluid chamber is pressed against the valve seat.

2. The vibration isolator as set forth in claim 1, characterized in that the elastic material forming the valve body is a rubber material or a synthetic resin material.

3. The vibration isolator as set forth in claim 1, characterized in that the elastic member comprises a coil spring formed in a tapered helical shape.

4. The vibration isolator as set forth in claim 1, characterized in that said orifice which is opened and closed by the opening and closing member is provided as an idle orifice, and
further comprising another orifice that is provided as a shake orifice.

* * * * *